United States Patent
Liu et al.

(10) Patent No.: US 12,102,259 B2
(45) Date of Patent: Oct. 1, 2024

(54) SYSTEM AND METHOD FOR COLLECTING AND ANNOTATING COOKING IMAGES FOR TRAINING SMART COOKING APPLIANCES

(71) Applicant: Guangdong Midea Kitchen Appliances Manufacturing Co., Ltd., Foshan (CN)

(72) Inventors: Qiang Liu, San Jose, CA (US); Jianliang Ma, San Jose, CA (US); Taoli Yang, San Jose, CA (US); Xuemei Yu, San Jose, CA (US)

(73) Assignee: GUANGDONG MIDEA KITCHEN APPLIANCES MANUFACTURING CO., LTD., Foshan (CN)

( * ) Notice: Subject to any disclaimer, the term of this patent is extended or adjusted under 35 U.S.C. 154(b) by 801 days.

(21) Appl. No.: 17/229,745

(22) Filed: Apr. 13, 2021

(65) Prior Publication Data
US 2021/0228022 A1   Jul. 29, 2021

Related U.S. Application Data

(63) Continuation of application No. PCT/CN2018/110283, filed on Oct. 15, 2018.

(51) Int. Cl.
A47J 37/04   (2006.01)
A47J 36/32   (2006.01)
(Continued)

(52) U.S. Cl.
CPC .......... *A47J 36/321* (2018.08); *A47J 37/041* (2013.01); *A47J 37/0629* (2013.01); *F24C 7/081* (2013.01);
(Continued)

(58) Field of Classification Search
CPC .... A47J 2202/00; A47J 36/321; A47J 37/041; A47J 37/0629; F24C 7/081;
(Continued)

(56) References Cited

U.S. PATENT DOCUMENTS

| 2015/0008216 A1 | 1/2015 | Pippia | |
| 2017/0011649 A1* | 1/2017 | Lee | G09B 5/06 |
| 2018/0257219 A1* | 9/2018 | Oleynik | B25J 9/0081 |

FOREIGN PATENT DOCUMENTS

| CN | 102802473 A | 11/2012 |
| CN | 104042124 A | 9/2014 |

(Continued)

OTHER PUBLICATIONS

Midea Group Co., Ltd., First Office Action, CN Application No. 201880100142.1, Apr. 13, 2022, 6 pgs.
(Continued)

*Primary Examiner* — Dana Ross
*Assistant Examiner* — James F Sims, III
(74) *Attorney, Agent, or Firm* — Morgan, Lewis & Bockius LLP

(57) ABSTRACT

The method and system disclosed herein presents a food preparation system that provides a user-friendly data collection and data annotation process that leverages crowd-sourced data to reduce the prohibitive costs associated with developing an extensive training set using dedicated cooking experiments and specialized manual annotation efforts. The food preparation system and corresponding method collect one or more data types (e.g., structured data such as temperature and weight data, and unstructured data such as images and thermal maps) and allow the collected data to be annotated by human users in order to provide information regarding the process of cooking, as well as food item identity, location, and/or outline information. A combination
(Continued)

of image processing and user input is utilized in order to create models with food recognition and determining cooking progress.

20 Claims, 17 Drawing Sheets

(51) Int. Cl.
 *A47J 37/06* (2006.01)
 *F24C 7/08* (2006.01)
 *G05B 13/02* (2006.01)
 *H05B 1/02* (2006.01)
(52) U.S. Cl.
 CPC ......... *G05B 13/027* (2013.01); *H05B 1/0263* (2013.01); *A47J 2202/00* (2013.01)
(58) Field of Classification Search
 CPC ................ G05B 13/027; G05B 19/042; G05B 2219/2643; H05B 1/0263
 USPC .......................................................... 99/325
 See application file for complete search history.

(56) References Cited

FOREIGN PATENT DOCUMENTS

| | | |
|---|---|---|
| CN | 205447921 U | 8/2016 |
| CN | 107249403 A | 10/2017 |
| CN | 107468048 A | 12/2017 |
| CN | 107909605 A | 4/2018 |
| CN | 107912964 A | 4/2018 |
| CN | 108463780 A | 8/2018 |
| EP | 2822355 A1 | 1/2015 |
| JP | 2014163541 A | 9/2014 |
| KR | 20170061476 A | 6/2017 |
| WO | WO 2006/001854 A2 | 1/2006 |

OTHER PUBLICATIONS

Guangdong Midea Kitchen Appliances Manufacturing Co., Ltd., First Office Action, CN Application No. 201880100142.1, Nov. 1, 2021, 12 pgs.
Guangdong Midea Kitchen Appliances Manufacturing Co., Ltd., International Search Report and Written Opinion, PCT/CN2018/110283, Jul. 19, 2019, 11 pgs.

* cited by examiner

Server 1100

Device 1200

SYSTEM AND METHOD FOR COLLECTING AND ANNOTATING COOKING IMAGES FOR TRAINING SMART COOKING APPLIANCES

PRIORITY CLAIM AND RELATED APPLICATIONS

This application is a continuation application of PCT International Application No. PCT/CN2018/110283, filed on filed on Oct. 15, 2018, and entitled "System and Method for Collecting and Annotating Cooking Images for Training Smart Cooking Appliances, Locating Food Items in Smart Cooking Appliances, and Determining Cooking Progress of Food Items in Smart Cooking Appliances" which is hereby incorporated by reference in its entirety.

FIELD OF THE TECHNOLOGY

The present disclosure relates to the field of cooking appliances, and in particular, to systems and methods for collecting and annotating cooking images for training smart cooking appliances.

BACKGROUND OF THE TECHNOLOGY

Conventional food preparation systems, such as microwave ovens, stove tops, toaster ovens, electric cookers, ovens, and steamers, etc. rely on manual inputs for cooking temperatures and cooking duration specification. These conventional systems require the user to possess a substantial amount of knowledge and experience regarding how different food items should be heated and cooked to the right level of doneness without compromising food safety and flavor requirements. Some newer models of electric food preparation systems allow a user to select from a few preset food options, and adjust cooking time and power level according to the user's selections. However, such preset selection menu is either too limited for the wide variety of food that a user might wish to cook, or too extensive making it difficult to navigate.

Some researchers have suggested using artificial intelligence and deep learning techniques to automatically recognize and locate food items and ingredients based on images of the food items. However, due to the large number of available food items, the different forms the food items may take on in various recipes, and the varied conditions under which the images are captured, recognition results are very poor. In addition, the number of food ingredients and cooking recipes are in the hundreds and thousands, and training of the artificial intelligence and deep learning models require a tremendous amount of annotated training data, making these solutions difficult to deploy outside of pure academic research settings.

In addition, even when training images are available, the problem of designing a suitable image processing method or data processing pipeline to determine the identity and/or cooking state of the food items inside the smart cooking appliances is very challenging, in terms of prediction accuracy, model size, training efficiency, and/or running speed.

For these reasons, improved methods and systems for collecting and annotating training data for smart cooking appliances and training image processing models, controlling functions of the cooking appliances, and assisting the users in using and interacting with the cooking appliances are desirable.

SUMMARY

As discussed in the background, improved methods and systems for collecting and annotating training data for smart cooking appliances and training image processing models, controlling functions of the cooking appliances, and assisting the users in using and interacting with the cooking appliances are desirable.

It will be advantageous to have a data collection and annotation process and user interface that are easy to use, applicable to a large variety of foods, and efficient in collecting and processing a large amount of data. The annotated training data collected from a large number of users can be used to train various image processing models to determine food item identities, food location and outlines, and cooking progress levels, which are further used to provide real-time feedback to the users and/or control the cooking progress automatically. Additionally, improved methods and systems for determination of cooking progress in smart cooking appliances for a wide variety of foods that allow users to receive real-time feedback and/or control the cooking functions automatically are desirable. Furthermore, improved image processing method or data processing pipeline to determine the identity, location, outlines, and/or cooking progress levels of the food items inside the smart cooking appliances provide better prediction accuracy, smaller model size, better training efficiency, and/or faster running speed.

Based on the methods and systems described herein, many problems associated with conventional food preparation systems can be solved or reduced. Conventional food preparation systems require the user to possess a substantial level of experience and knowledge of cooking in order to successfully prepare cooked food. Further, cooking usually requires the user to monitor the food and supervise the cooking process, both of which can be tedious and time consuming. Thus, a food preparation system that can provide guidance for busy and/or inexperienced users and/or monitor the progress of food as it is being cooked to reduce the amount of experience and attention needed by a user to successfully cook food is desired.

Further, it is important to provide easy to implement and straight forward data collection and data annotation methods and systems that are likely to be conducive for average home cooks to submit their cooking images and help with the annotation efforts, and that is efficient for specialized annotation experts to edit and review the annotated data. The method and system disclosed herein presents a food preparation system that provides a user-friendly data collection and data annotation process that leverages crowd-sourced data to reduce the prohibitive costs associated with developing an extensive training set using dedicated cooking experiments and specialized manual annotation efforts. The food preparation system and corresponding method collect one or more data types (e.g., structured data such as temperature and weight data, and unstructured data such as images and thermal maps) and allow the collected data to be annotated (e.g., by a user, a technician, and/or an expert) in order to provide information regarding the process of cooking (e.g., correlating temperature, weight, heat distribution, and/or food appearance with the progress of the cooking process), as well as food item identity, location, and/or outline information. A combination of image processing and user input is utilized in order to create models with food recognition (e.g., determining what food items are present and where in the smart cooking appliance are the respective food items located) and determining cooking progress (for example, determining if the food is undercooked, fully cooked, overcooked, etc.). User input and social networks are leveraged to create a crowd-sourced database of training sets for the food preparation system and circumvent cost-prohibitive ways of developing the training data sets.

Additionally, a method and system for assessing individual and/or overall cooking progress of food items in a food preparation system is disclosed herein. The method for assessing cooking progress of food items relies on reliable annotated data, such as that collected and annotated using the process briefly outlined above, in order to provide real-time feedback and guidance to a user. The disclosed methods and systems allow for different types of foods to be cooked simultaneously and monitored individually. Further, the methods and systems are specifically trained to optimize the accuracy of determining cooking progress of food items, utilizing a difference feature tensor that compares the cooking progress of a food item with a baseline image of the food item at the start of the cooking process. The noise and averaging effect due to the presence of different food items and/or same types of food items with slight variations in appearances and consistencies is reduced in the cooking progress level determination model, resulting in better accuracy of the cooking progress level assessment.

Additionally, a method and system for locating food items and determining their outlines in the images captured by a food preparation system is disclosed herein. The method relies on reliable annotated data, collected and annotated using the process briefly outlined above, to determine locations and outlines of food items, with a higher accuracy than conventional methods, due to the additional constraints provided by food item identities and cooking progress levels of the food items. Once the food item locations and outlines are determined in a test image captured by the cooking appliance, the food item location and outline information can be used to extract portions of the test images to individually determine the cooking progress levels of the food items using a dedicated cooking progress determination model that is trained separately using the collected annotated training data. This additional step of determining cooking progress level is more accurate, and less prone to noise in the images or imaging conditions in the cooking appliances. With the location and outline determination performed prior to the cooking progress level determination, the disclosed methods and systems allow for different types of foods to be cooked simultaneously and monitored individually, and improving the functions of the cooking appliances and the convenience of the users.

In one aspect, in accordance with some embodiments, a method is performed by a computing system that is communicably coupled with a cooking appliance and that is configured to control one or more functions of the cooking appliance. The cooking appliance includes a food support platform configured to support food items, one or more first sensors for capturing structured data, one or more second sensors for capturing unstructured data, and one or more heating units that are configured to the heat food items placed on the food support platform during the operation of the cooking appliance. Structured data includes temperature data corresponding to the food items during operation of the cooking appliance. Unstructured data includes image data that corresponds to the food items during the operation of the cooking appliance. The computing system includes one or more processors and memory storing instructions for performing the method. The method includes: activating the one or more first sensors and the one or more second sensors to capture first cooking data during a first cooking process in the cooking appliance. Activating the one or more first sensors and the one or more second sensors includes capturing a sequence of temperature values and a sequence of images during the first cooking process, wherein each of the sequence of temperature values and each of the sequence of images are recorded with respective timestamps. The method further includes: displaying, via a display generation component coupled to the computing system, at least a subset of the sequence of images in a first annotation user interface. The first annotation interface includes each of the subset of the sequence of images displayed in accordance with a timeline of the first cooking process and a plurality of input regions for specifying respective cooking progress levels of food items in the subset of the sequence of images. The method further includes, after receiving a first user input specifying the respective cooking progress levels of food items in the subset of the sequence of images, grouping the subset of images with corresponding temperature data and cooking progress levels specified by the first user input; and transmitting the subset of images with the corresponding temperature data and cooking progress levels to a server of training data corpus for training smart cooking appliances.

In another aspect, in accordance with some embodiments, a method of locating food item in a smart cooking appliance is performed at a computer system that has one or more processors and memory, and that is communicably coupled to at least a first cooking appliance. The method includes: obtaining a plurality of training images each containing respective food items of one or more food item types; obtaining respective annotation data corresponding to each food item included in each of the plurality of the training images, wherein the respective annotation data for said each food item in said each training image includes a food item type label corresponding to a respective food item type of said each food item, a set of location coordinates corresponding to a respective location of said each food item within said each image, a description of an outline corresponding to a respective boundary of said each food item within said each image, and a cooking progress level label corresponding to said each food item as represented in said each image; and training an image processing model using the plurality of training images with the respective annotation data as ground truth, wherein the image processing model includes a plurality of feature extraction layers, a region proposal network, and an evaluation network, and wherein the evaluation network has four prediction heads corresponding to (1) food item type, (2) location coordinates, (3) outline, and (4) cooking progress level of a respective food item identified in an input image.

In another aspect, in accordance with some embodiments, a method of determining cooking progress levels of food items is performed at a computer system that has one or more processors and memory. The computer system is communicably coupled to at least a first cooking appliance. The method includes: obtaining a first baseline image corresponding to an initial cooking progress level of a first food item inside the first cooking appliance; obtaining a first test image corresponding to a current cooking progress level of the first food item inside the first cooking appliance; generating a first test feature tensor corresponding to the first test image, wherein generating a first test feature tensor that corresponds to the first test image includes obtaining a first baseline feature tensor corresponding to the first baseline image that has been extracted from the first baseline image using a first feature extraction model, extracting a respective feature tensor corresponding to the first test image using the first feature extraction model, and calculating a difference feature tensor based on a difference between the respective feature tensor corresponding to the first test image and the first baseline feature tensor corresponding to the first baseline image, and wherein the difference feature tensor is used as the first test feature tensor corresponding to the first test image; and determining the current cooking progress level of the first food item inside the first cooking appliance using the first test feature tensor as input for a cooking progress determination model that has been trained on difference feature tensors corresponding to training images of instances of the first food item at various cooking progress levels.

In accordance with some embodiments, a computing system includes processors and memory storing instructions that, when executed, causes the one or more processors to perform the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause performance of the operations of any of the methods described herein. In accordance with some embodiments, an electronic device includes: means for capturing images, means for heating food items, and means for performing or causing performance of the operations of any of the methods described herein.

Various advantages of the disclosed technical solutions are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1A:
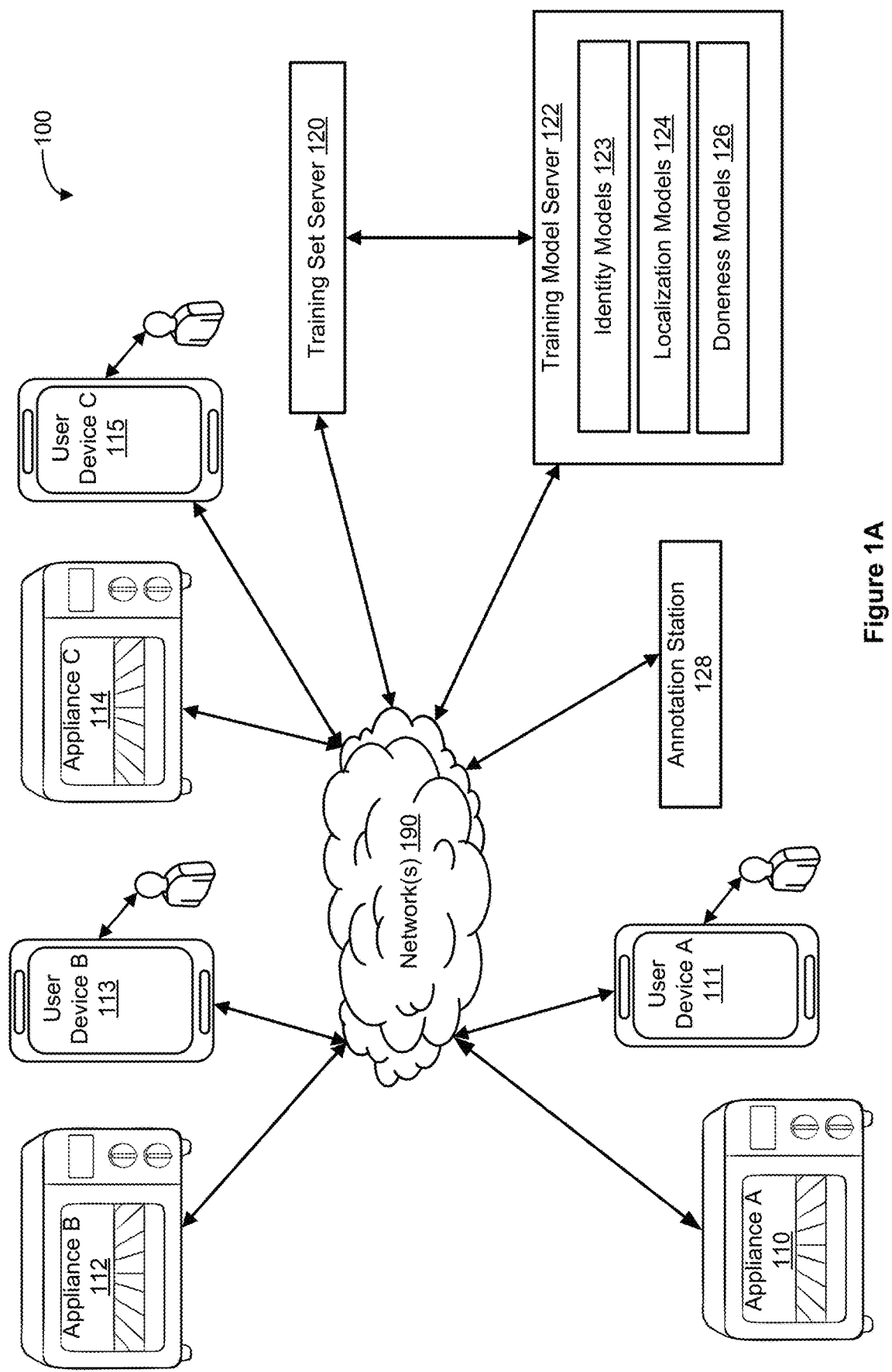
FIG. 1A shows a block diagram of an operation environment of a food preparation system (e.g., including a smart cooking appliance and related servers) in accordance with some embodiments.

FIG. 1A shows a block diagram of an operation environment 100 of a food preparation system (e.g., including a smart cooking appliance and related servers) in accordance with some embodiments.

The operation environment 100 of a food preparation system includes one or more cooking appliances (e.g., appliance A 110, appliance B 112, and appliance C 114), connected to one or more servers (e.g., training set server 120 and training model server 122), and optionally to one or more user devices (e.g., user device A 111, user device B 113, and user device C 115) and/or annotation station(s) 128, via network 190 (e.g., a wide area network such as the Internet, or a local area network such as a smart home network).

In some embodiments the one or more cooking appliances (e.g., smart ovens, smart stovetops, etc.) are configured to collect raw sensor data (e.g., image, weight, temperature, thermal map data, etc.) and send the raw sensor data to corresponding user devices (e.g., smart phones, tablet devices, etc.), annotation station 128 (e.g., workstations and desktop computers), and/or training set server 120 (e.g., server provided by the manufacturer of the cooking appliances or third-party service providers for the manufacturer). In some embodiments, the one or more cooking appliances are also configured to receive control instructions from training model server 122 and/or a corresponding user device (e.g., appliance A 110 may receive control instructions from training model server 122 to set the smart oven temperature to 425° F. for roasting vegetables and appliance A 110 may receive control instructions from user device A 111 to change the temperature to 400° F.). Additional details regarding the one or more cooking appliances (e.g., appliance A 110, appliance B 112, and appliance C 114) is described in detail with reference to other parts of the present disclosure.

In some embodiments, the one or more user devices are configured to receive raw sensor data from a respective appliance (e.g., user device A 111, which corresponds to appliance A 110, is configured to receive raw sensor data from appliance A 110). In some embodiments, the one or more user devices are also configured to send annotated data to annotation station 128 and/or training set server 120. In some embodiments, the one or more user devices are configured to generate and send control instructions to the respective appliance (e.g., user device A 111 may send instructions to appliance A 110 to turn appliance A 110 on/off or to adjust a setting on appliance A 110, such as turning on a broiler or changing the temperature of a smart oven). In some embodiments, the one or more user devices include, but is not limited to, a mobile phone, a tablet, or a computer device. In some embodiments, one or more user devices may correspond to one appliance (e.g., a computer and a mobile phone may both correspond to appliance A 110 (e.g., both are registered to be a control device for appliance A in an appliance setup process) such that appliance A 110 may send raw sensor data to either or both the computer and the mobile phone). In some embodiments, a user device corresponds to (e.g., shares data with and/or is in communication with) an appliance (e.g., user device A 111 corresponds to appliance A 110). For example, appliance A 110 may collect data (e.g., raw sensor data, such as images or temperature data) and send the collected data to user device A 111 so that the collected data may be annotated by a user on user device A 111.

In some embodiments, annotation station 128 is configured to receive collected data from the one or more appliances (e.g. appliances 110, 112, and 114) so that the collected data may be annotated by specialized annotation personnel. In some embodiments, annotation station 128 is configured to receive annotated data from the one or more user devices (e.g., user devices 111, 113, and 115) for review, editing, and/or approval by the specialized annotation personnel. In some embodiments, when annotated data from the one or more user devices have been approved at annotation station 128, annotation station sends the approved data to training set server 120 to be included in the training corpus stored at the training set server. In some embodiments, annotation station 128 retrieves annotated data from sever 120 for review, editing, and/or approval by the specialized annotation personnel. In some embodiments, annotation station 128 retrieves unannotated data from sever 120 for annotation by the specialized annotation personnel. Sensor data that has been annotated and/or approved at annotation station 128 is returned to server 120 for inclusion in the training corpus.

In some embodiments, training set server 120 is configured to receive raw sensor data from the one or more cooking appliances (e.g. appliances 110, 112, and 114), and/or receive annotated data from the one or more user devices (e.g., user devices 111, 113, and 115). In some embodiments, training set server 120 is also configured to send raw and/or annotated data to annotation station 128, and receive annotated and/or approved annotated data from annotation station 128. Training set server 120 is configured to preprocess the annotated data, e.g., to group, divide, and correlate the training data, and index and store the training data, in accordance with the training models and training methods employed by training model server 122. Training set server 120 is configured to send selected training data (e.g., data that includes, corresponds to, or is based on annotated data that has been approved at annotation station 128) to training model server 122, in accordance with the particular training model requesting the training data.

In some embodiments, training model server 122 is configured to receive training data from training set server 120. Training model server is also optionally configured to send control instructions (e.g., machine instructions prepared according to the control protocols of a particular cooking appliance) and/or send text data (e.g., text messages) to the one or more appliances and/or user devices. Training model server 122 includes identity models 123 (e.g., also referred to as food item identity determination model"), localization models 124 (e.g., also referred to as "food item location and outline determination model"), and doneness models 126 (e.g., also referred to as "cooking progress level determination model"). Localization models 124 are related to identifying and locating food items currently being cooked in a cooking appliance. For example, localization models 124 may be used to identify two pieces of chicken on a left side of the oven rack of the smart oven and four cookies on the right side of the oven rack of the smart oven, and outline each of them in an image captured by smart oven. Doneness models 126 are related to determining the cooking progress level or the "done-ness" of food items present in a cooking appliance. For example, doneness models 126 may include models for determining whether a food item is fully cooked (e.g., doneness models 126 may allow a smart stovetop to determine that a piece of steak is cooked to medium-rare) or 80% cooked. Training model server 122 trains localization models 124 and/or doneness models 126 based on training data received from training set server 120. Once the training of localization models 124 and doneness models 126 are sufficiently completed (e.g., achieved a threshold level of accuracies), the training set server 120 receives requests from cooking appliances to determine food item locations and outlines, and/or cooking progress levels of food items in real-time based on sensor data captured by the cooking appliances. In some embodiments, the cooking progress levels determined by the training set server 120 is provided back to the requesting cooking appliances, such that each cooking appliance determines an appropriate action, e.g., changing an operation of the cooking appliance and/or alerting a user, based on the determined cooking progress levels.

In some embodiments, cooking appliances (e.g. appliances 110, 112, and 114), user devices (e.g., user devices 111, 113, and 115), annotation station 128, training set server 120, and training model server 122 are connected (e.g., sharing data with and/or in communication with) through one or more networks 190. One or more networks 190 may include wired and wireless networks and may be a local area network of a home or a wide area network (e.g., Internet).

Figure 1B:
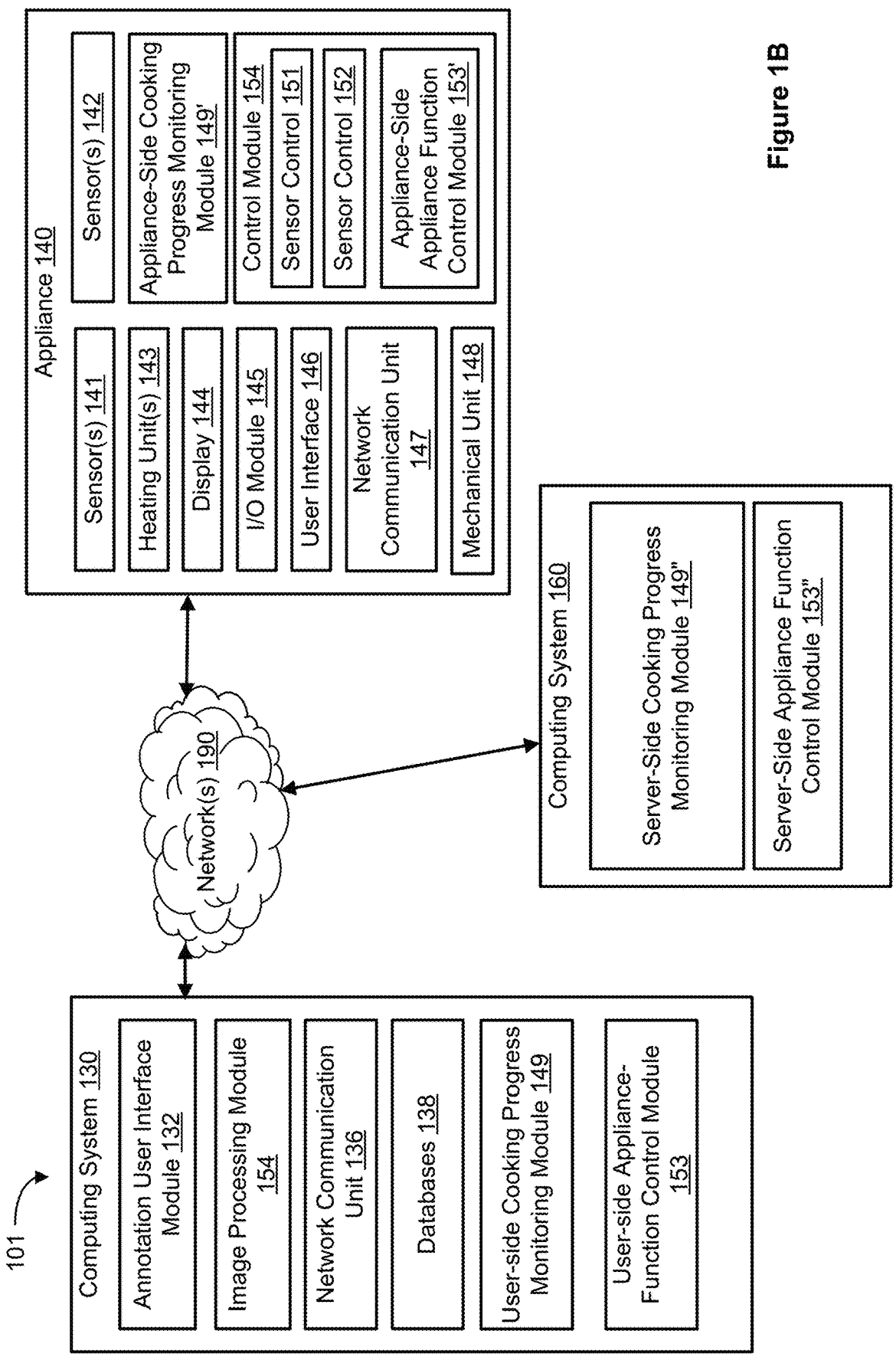
FIGS. 1B-1C show block diagrams of a food preparation system in accordance with some embodiments.

FIG. 1B show block diagrams of a food preparation system in accordance with some embodiments.

In some embodiments, as shown in FIG. 1B, food preparation system 101 includes cooking appliance 140 and computing system 130 that is implemented separately from cooking appliance 140. Cooking appliance 140 can serve as any of cooking appliances 110, 112, and 114 in FIG. 1A. In some embodiments, computing system 130 is in communication with cooking appliance 140 through one or more networks 190. In some embodiments, computing system 130 is implemented on a user device (e.g., in association with a user application for controlling and interacting with the cooking appliance). In some embodiments, computing system 130 and appliance 140 further communicate with computing system 160 to accomplish some of the functions on computing system 130 and appliance 140 in accordance with a client-server configuration. In some embodiments, computing system 160 is implemented on a server of a manufacturer of the cooking appliance (e.g., on training model server 122). In some embodiments, computing system 160 is implemented on a standalone computer (e.g., on a local server of a smart home).

Referring to FIG. 1B, computing system 130 includes one or more of annotation user interface module 132, imaging processing module 134, network communication unit 136, and one or more databases 138. which corresponds to user devices as described above with respect to FIG. 1A (e.g., user devices 111, 113, and 115). In some embodiments, computing system 130 further includes user-side cooking progress monitoring module 149 and user-side appliance-function control module 153 to facilitate the cooking progress monitoring and appliance control aspects of the food preparation system, in addition to the data collection and annotation aspect of the food preparation system as described herein.

In some embodiments, annotation user interface module 132 allows a user of computing system 130 to view and annotate raw sensor data received from a corresponding appliance 140 (e.g., appliance 110, 112, or 114). For example, a user may use an application on their user device (e.g., user device 111, 113, or 115) to view images and temperature data recorded by a corresponding appliance. The user may be able to add annotations and details to the collected data, described in further detail below with respect to FIG. 3, for example.

In some embodiments, image processing module 154 obtains images captured by imaging system of appliance 140 and processes the images for analysis. The functions of image processing module 154 and imaging system of appliance 140 are described below with respect to FIG. 2A, for example.

Network communication unit 136 allows computing system 130 to communicate with appliance 140 and/or computing system 160 over one or more networks 190.

In some embodiments, databases 138 include a database of previously captured images of food items or images from other similar food preparation systems. In some embodiments, databases 138 includes ingredient databases that allow the computing system to provide nutritional information and recipes to the user.

In some embodiments, computing system 130 includes an application that provides user-side functions, such as user-side cooking progress monitoring and appliance-function control, in conjunction with computing system 160 and appliance 140. In some embodiments, the application also provides access to a social network for the user to exchange cooking images and recipes with others using the same or similar appliances, and/or to contact the manufacturer or service providers for information and services related to the appliance 140.

In some embodiments, user-side cooking progress monitoring module 149 is configured to determine cooking progress of food items based on real-time sensor data captured by appliance 140 using food item location and outline determination models and food cooking progress level determination models that have been trained on computing system 160. In some embodiments, user-side cooking progress monitoring module 149 is configured to determine the cooking progress of food items locally using a local copy of the food item location and outline determination models and food cooking progress level determination models. In some embodiments, the user-side cooking progress monitoring module 149 sends a request to computing system 160, and receive the determination results in real-time from the computing system 160. The request includes real-time sensor data captured by appliance 140, and the results are determined using food item location and outline determination models and food cooking progress level determination models that have been trained on computing system 160.

In some embodiments, user-side appliance-function control module 153 is configured to provide a user interface for the user to directly control the appliance functions (e.g., turning the appliance on/off or setting an appliance parameter, etc.), and/or automatically generate control instructions based on the result of the cooking progress monitoring. In some embodiments, the result of the cooking progress monitoring is provided to the user-side appliance-function control module 153 from the user-side cooking progress monitoring module 149. In some embodiments, the result of the cooking progress monitoring is provided to the user-side appliance-function control module 153 from computing system 160. In some embodiments, the result of the cooking progress monitoring is provided to the user-side appliance-function control module 153 from appliance 140.

In some embodiments, appliance 140 includes one or more first sensors (e.g., sensors 141), one or more heating units 143, display 144, I/O module 145, user interface 145, network communication unit 147, mechanical unit 148, control module 155, imaging system, and, optionally, appliance-side cooking progress monitoring module 149'. Control module 155 includes an optional appliance-side appliance-function control unit 153'.

In some embodiments, the one or more first sensors 141 are configured to capture structured data, such as temperature, weight, and/or humidity. Structured data, as discussed herein, refers to quantitative or state data such as temperature, humidity, time, on/off, oven mode, etc. For example, the one or more first sensors 212 may be a temperature sensor (e.g., thermometer) or a humidity sensor, or weight sensor on the food support platform of the cooking appliance 140.

In some embodiments, the one or more heating units 143 are configured to heat at least a portion of the cooking compartment of the appliance (e.g., a heating coil configured to heat one side of a cooktop). Further examples of the function of one or more heating units 143 is provided below with respect to FIG. 2A, for example.

In some embodiments, appliance 140 includes a display 144 that can provide information about appliance 140 to a user (e.g., the broiler function of the smart oven is currently turned on). In some embodiments, display 144 may be integrated with I/O module 145 and user interface 146 to allow the user to input information into or read out information from appliance 140. In some embodiments, display 144 in conjunction with I/O module 145 and user interface 146 provide recommendations, alerts and nutritional information to the user and receive control instructions from the user (e.g., via hardware and/or software interfaces provided by appliance 140). In some embodiments, display 144 may be a touch screen display or a display that includes buttons. In some embodiments, display 144 may be a simple display with no touch-screen features (such as a conventional LED or LCD display) and user interface 146 may be hardware buttons or knobs that can be manually controlled. In some embodiments, user interface 146 optionally includes one or more of the following a display, a speaker, a keyboard, a touch-screen, a voice input output interface etc.

Network communication unit 147 is analogous in function to network communication unit 137. Network communication unit 147 allows appliance 140 to communicate with computing system 130 and/or computing system 160 over one or more networks 190.

Mechanical unit 148 described herein refers to hardware and corresponding software and firmware components of appliance 140 that are configured to physically change the internal sensing (e.g., imaging), heating and/or food layout configuration of the cooking appliance 140. For example, the one or more first sensors 141 may correspond to a mechanical unit such that the one or more sensors 141 are movable to scan a respective area in a cooking compartment of appliance 140 (e.g., a motor may be configured to move a sensor across a predetermined area in order to capture data across the predetermined area). In another example, the food support platform of the cooking appliance may correspond to a mechanical unit including motors and/or robotic arms to change the relative positions of the heating elements and various parts of the food supporting platform, and/or to move food items to different parts of the food support platform or food storage compartment inside the cooking appliance. In some embodiments, the mechanical units 148 of the appliance 140 are operated in accordance with instructions from the appliance-function control unit of the food preparation system (e.g., appliance-side appliance-function control module 153', user-side appliance-function control module 153, and/or server-side appliance-function control module 153").

In some embodiments, appliance-side cooking progress monitoring module 149' is configured to monitor food that is present in a cooking compartment or cooktop of appliance 140. For example, appliance-side cooking progress monitoring module 149' may, based on raw data recorded by the one or more first sensors 212 and/or the one or more second sensors 214, determine that the food has been cooked to a medium doneness. In some embodiments, appliance-side cooking progress monitoring module 149' is configured to determine cooking progress of food items based on real-time sensor data captured by sensors 141 and imaging system using food item location and outline determination models and food cooking progress level determination models that have been trained on computing system 160. In some embodiments, appliance-side cooking progress monitoring module 149' is configured to determine the cooking progress of food items locally using a local copy of the food item location and outline determination models and food cooking progress level determination models. In some embodiments, the appliance-side cooking progress monitoring module 149' sends a request to computing system 160, and receive the determination results in real-time from the computing system 160. The request includes real-time sensor data captured by appliance 140, and the results are determined using food item location and outline determination models and food cooking progress level determination models that have been trained on computing system 160.

In some embodiments, imaging system includes one or more second sensors 142. The one or more second sensors 142 are configured to capture unstructured data. Examples of unstructured data include RGB images and thermal or infrared images. For example, the one or more second sensors 142 may be configured to capture or record still images or videos of the food present in a cooking compartment or cooktop of appliance 140. Further examples of the function of the one or more second sensors 214 are provided below with respect to FIG. 2A. In some embodiments, imaging system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. Thus, the imaging system eliminates the problems with conventional imaging systems which require the user's special attention to place a reference marker within the images or use images without the benefit of the size and location and orientation information of the items within the images. In some embodiments, the imaging system includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. In some embodiments, the image capture trigger system also instructs the camera to capture and store an image of the oven rack immediately before the oven door is opened, as the compartment baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition. In some embodiments, image processing module 154 obtains the images captured by the one or more second sensors 142, and preprocesses the images to remove the background from the images based on the compartment baseline image captured before the insertion of the food item. The compartment baseline image captures the exact condition of the food support platform in the food cooking compartment of the food preparation system, and provides an excellent filter for the images containing the food item to remove the background.

In some embodiments, control module 155 includes sensor control 151, sensor control 152, and appliance-side appliance-function control module 153'. Sensor control 151 is configured to control and adjust the one or more first sensors 141. For example, sensor control 151 may send instructions for the one or more first sensors 141 to record temperature data at 1 minute intervals. Sensor control 152 is configured to control and adjust the one or more second sensors 142. For example, sensor control 152 may send instructions for the one or more second sensors 142 to be moved along a first direction and to take capture a picture when the one or more second sensors 142 are at the starting position before being moved and at the final position after being moved.

Appliance-side appliance function control module 153' is configured to control and adjust the various functions of appliance 140. For example, appliance-side appliance function control module 153' may send instructions to heating units 143 to activate a first heating unit of the one or more heating units. In some embodiments, appliance-side appliance-function control module 153' generates and send control instructions to various components of the appliance 140 based on preconfigured operation protocols (e.g., to implement the normal routine functions of the appliance 140). In some embodiments, appliance-side appliance-function control module 153' generates and send control instructions to various components of the appliance 140 based on real-time cooking progress monitoring of the food items within the cooking appliance (e.g., to adjust functions of the appliance 140 automatically without user intervention based on preset reactions protocols or programs). In some embodiments, appliance-side appliance-function control module 153' generates and send control instructions to various components of the appliance 140 based on real-time user instructions received from user devices or via user interface 146 of appliance 140. In some embodiments, the result of the cooking progress monitoring is provided to the appliance-side appliance-function control module 153' from the user-side cooking progress monitoring module 149. In some embodiments, the result of the cooking progress monitoring is provided to the appliance-side appliance-function control module 153' from computing system 160. In some embodiments, the result of the cooking progress monitoring is provided to the appliance-side appliance-function control module 153' from appliance-side cooking progress monitoring module 149'.

In some embodiments, computing system 160 includes server-side cooking progress monitoring module 149" and server-side appliance-function control module 153". In some embodiments, the server-side cooking progress monitoring module 149" employs localization models 124 and doneness models 126 shown in FIG. 4 to determine food item identity, location, outlines, and/or cooking progress levels of food items from real-time sensor data received from cooking appliance 140 (e.g., directly or through computing system 130). In some embodiments, computing system 160 is implemented by training model server 122 in FIGS. 1 and 4, for example.

The functions of various systems within food preparation system 101 in FIG. 1B are merely illustrative. Other configurations and divisions of the functionalities are possible. Some functions of one sub-system can be implemented on another sub-system in various embodiments.

Figure 1C:
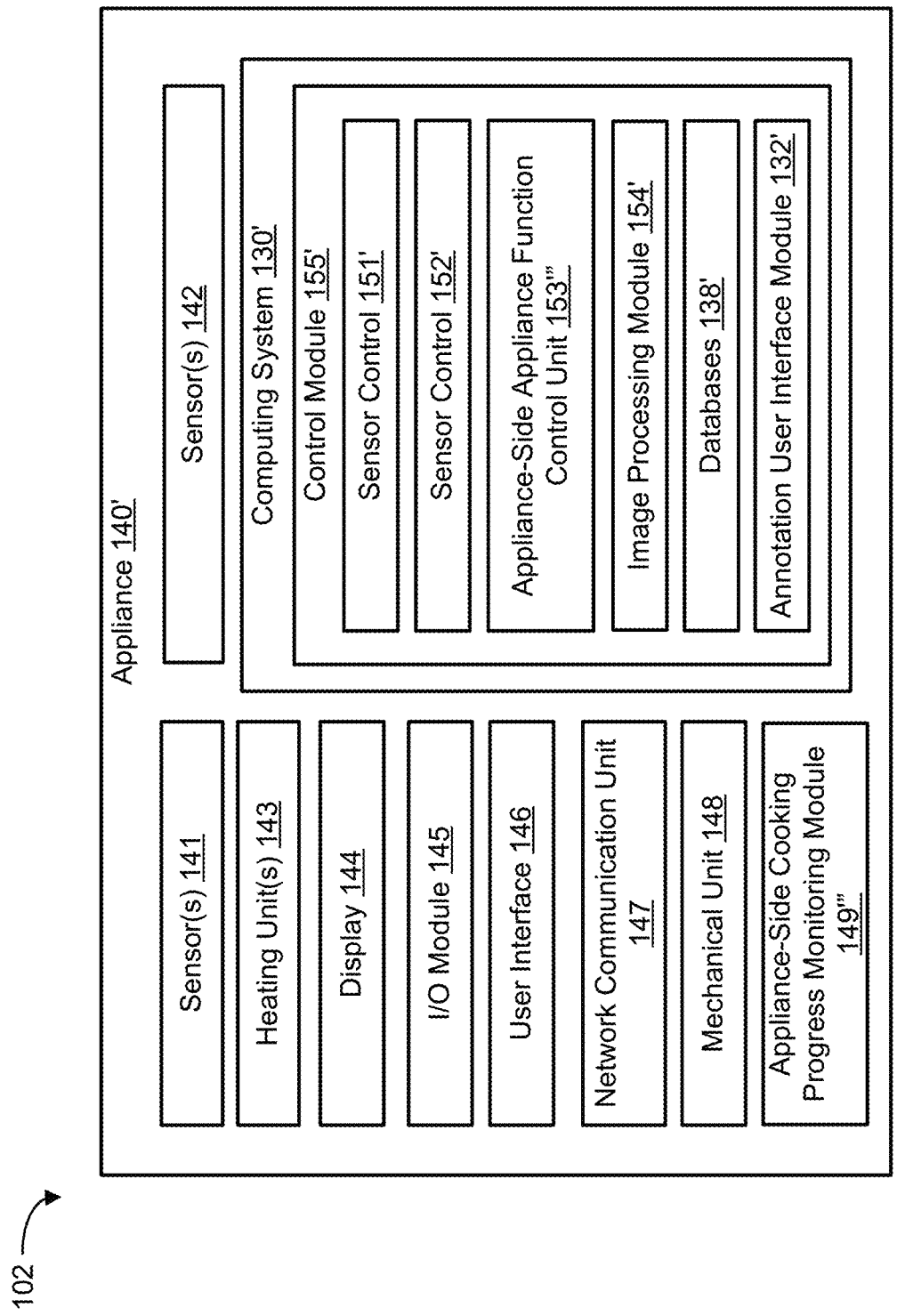

In some embodiments, as shown in FIG. 1C, food preparation system 102 includes a computing system 130' that is integrated with appliance 140'. In some embodiments, computing system 130' communicates with computing system 160' to accomplish some of the functions of appliance 140'. In some embodiments, appliance 140' optionally communicates with computing system 160 to outsource some of the functions of appliance 140'.

Referring to FIG. 1C, appliance 140' has a built-in computing system 130'. Appliance 140' includes sensors 141, heating unit(s) 143, display 144, I/O module 145, user interface 146, network communication unit 147, mechanical unit 148, and imaging system. These components of appliance 140' correspond to those in appliance 140 and have similar functionalities that will not be repeated herein for brevity.

In some embodiments, computing system 130' within appliance 140' includes control unit 155', sensor control 151', sensor control 152', appliance-side cooking progress monitoring system 149''', appliance-side appliance-function control module 153''', image processing system 154', databases 138', and appliance-side annotation user interface module 132'. The functions of these components correspond to their respective counterparts with the same names in appliance 140 (e.g., sensor control 151' has the same function as sensor control 151) and will not be repeated for brevity. In some embodiments, annotation user interface module 132''' may allow a user to view and annotate raw user data on a user device, separate from appliance 140. In comparison, appliance-side annotation user interface module 132' may allow a user to view and annotate raw user data on display 144 of appliance 140' and/or annotate the cooking progress levels of food items in the images with voice input.

The above examples are provided merely for illustrative purposes. More details of the functions of the various components are set forth below with respect to other figures and illustrations. It can be understood that one or more components described herein may be used independently of other components.

Figure 2A:
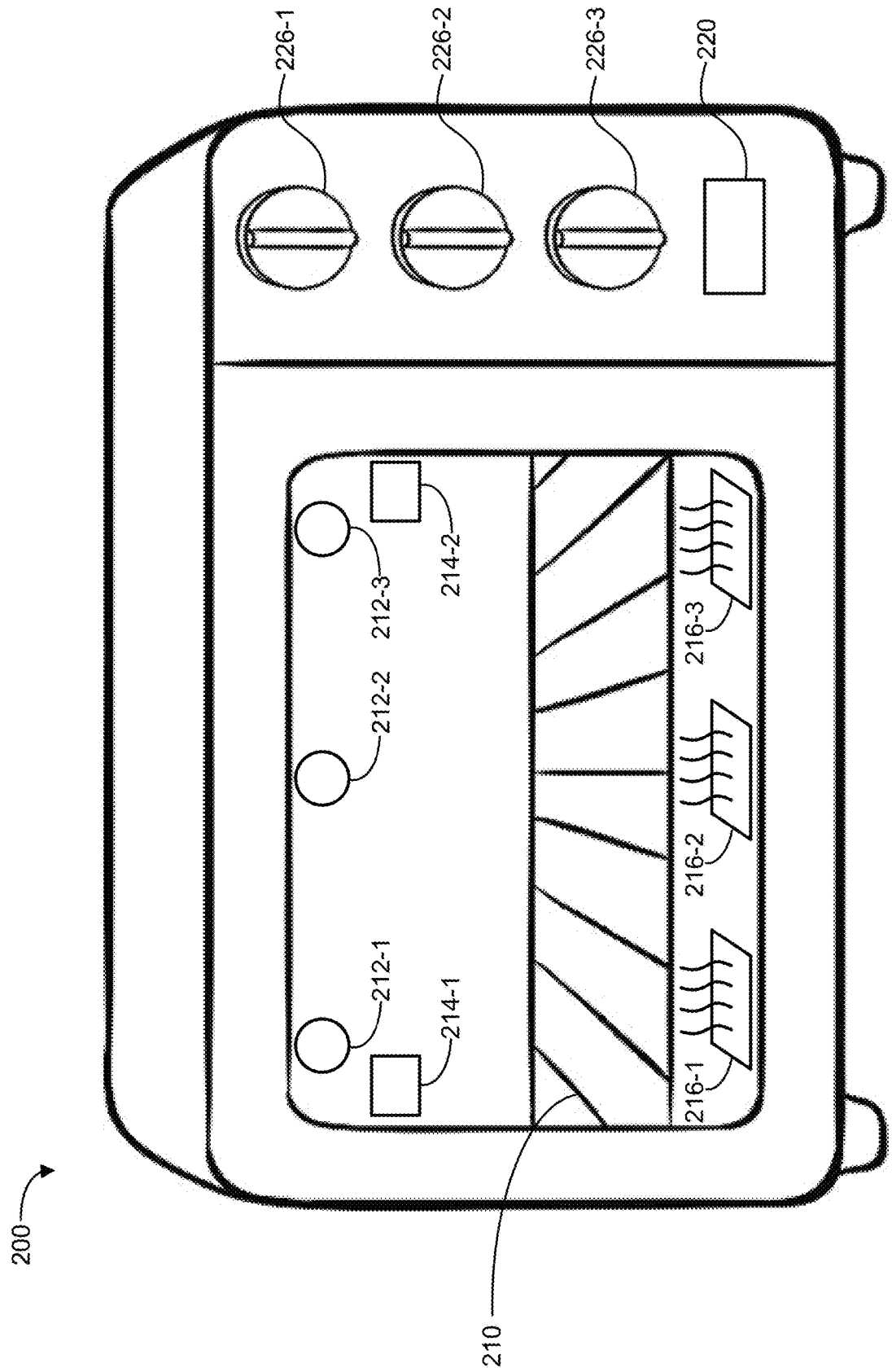
FIG. 2A shows a smart cooking appliance in accordance with some embodiments.
Figure 2B:
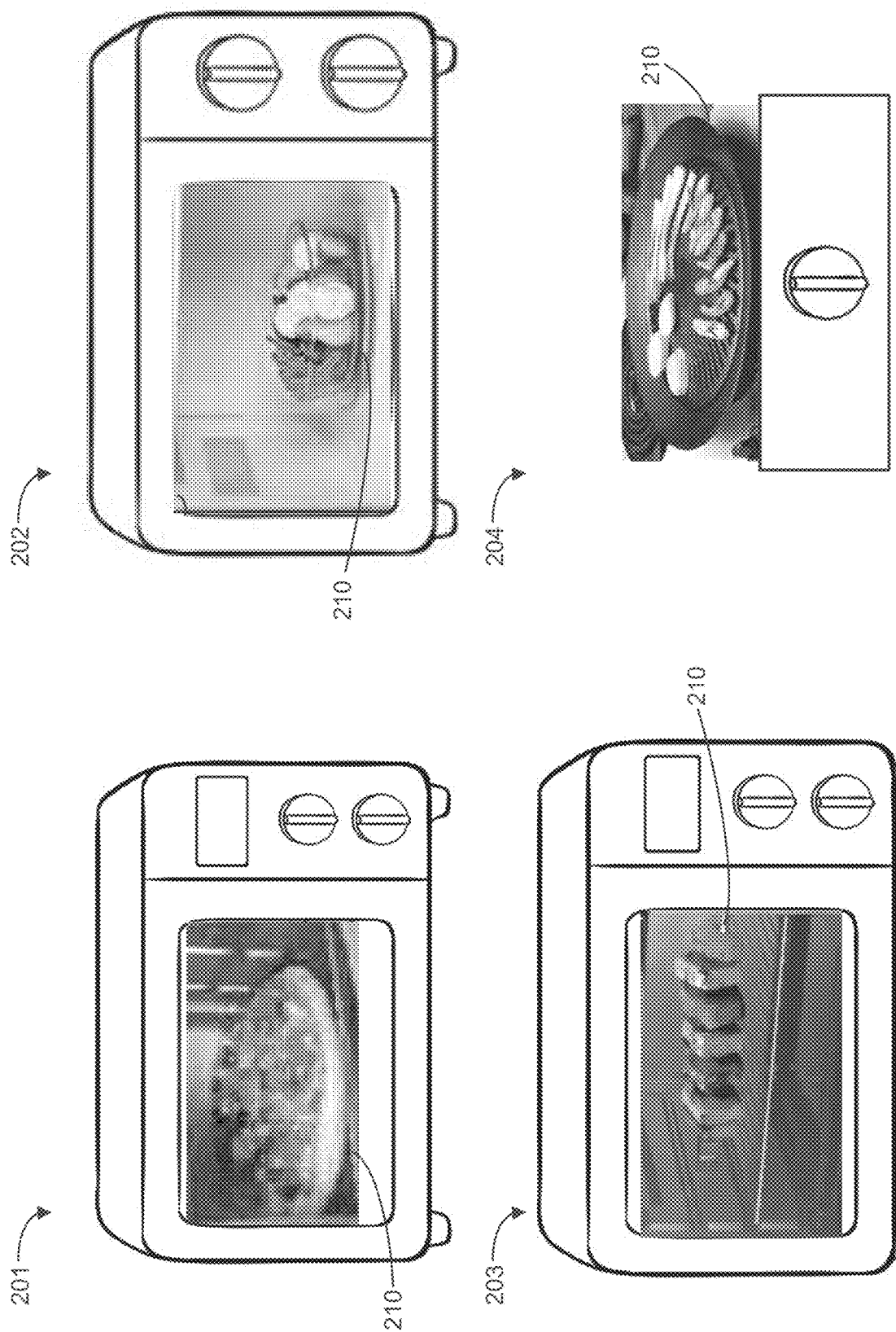
FIG. 2B shows a number of exemplary smart cooking appliances in accordance with some embodiments.

FIG. 2A illustrates a cooking appliance of a food preparation system in accordance with some embodiments. FIG. 2B illustrates a number of exemplary cooking appliances in accordance with some embodiments.

FIG. 2A shows an exemplary cooking appliance 200, which can serve as appliance 140 and appliance 140' in FIGS. 1B and 1C. Cooking appliance 200 includes systems for heating food items including cooking raw food items or reheating previously cooked food items. Cooking appliance 200 includes heating systems that is capable of heating food items through various means, such as conduction means, convection means, radiation means, conduction means, etc. The amount of heat or power dissipated to the food items, the rate by which the heat is dissipated to the food items, the distribution of the heat that is dissipated to the food items, and/or the duration of the heat dissipation are controllable by various control means (e.g., knobs, buttons, or apps), discussed below, that are installed on the cooking appliance and coupled to the heating means. In some embodiments, the controls are manually adjustable by a user. Examples of the cooking appliance 200 are shown in FIG. 2B.

Referring to FIG. 2A, cooking appliance 200 includes food support platform 210 that is configured to support and hold food items (e.g., oven rack in an oven, pan on a stovetop, plate in a microwave, of basket in an air fryer). Although only one food support platform 210 is shown in FIG. 2A, cooking appliance 200 may include one or more food support platforms. In some embodiments, food support platform 210 includes mechanical unit 148 that can move and/or adjust a configuration of food support platform 210. For example, turning and churning mechanisms such as stirrers, rotisseries, and fans are configured to turn or rotate food items and redistribute the heat or the heating units around the food items. For example, a barbeque spit may be able to rotate in order to evenly cook food. In another example, an oven rack may have an adjustable height to move food towards or away from a broiler.

In some embodiments, cooking appliance 200 also includes one or more first sensors 141 (e.g., shown as first sensors 212-1, 212-2, and 212-3 in FIG. 2A) and one or more second sensors 142 (e.g., shown as second sensors 214-1 and 214-2 in FIG. 2A). For example, the one or more first sensors 212 and the one or more second sensors 214 may be located in situ. In some embodiments, the positions of one or more first sensors 212 and/or the one or more second sensors 214 are movable and/or adjustable. For example, cooking appliance 200 may include two first sensors that scan a respective predetermined area of the interior of cooking appliance 200. For example, the one or more second sensors 142 are part of an in situ imaging system (e.g., imaging system) that includes one or more still image cameras or video cameras (e.g., second sensors 214-1 and 214-2) that are installed at a location within or in proximity to the cooking appliance 200 such that the field of view of the cameras encompass the interior of the compartment in which food items will be inserted and cooked, or an exposed cooking surface of the cooking appliance (e.g., the heating surface of a grill pan or electric wok). The one or more second sensors 142 are directed to a food support surface 210 of cooking appliance 200 (e.g., see FIG. 2B, oven rack in toaster oven 201, microwave rotation plate in microwave oven 202, a rotational rod in rotisserie oven 203, a cooking surface of electric cooktop 204). Each sensor of the one or more second sensors 142 can be located either inside of the cooking compartment of food preparation system 200 (e.g., see FIG. 2B, inside toaster oven 201) or directly above the food support surface (e.g., see FIG. 2B, above cooktop 204). In some embodiments, the positions and orientations of one or more second sensors 142 are movable and/or adjustable. For example, food preparation system 200 may include two first sensors that scan a respective predetermined area of the interior of food preparation system 200. For example, the one or more cameras are optionally installed in the interior top wall of a smart oven, with a field of view of the top of the oven rack. Another camera is optionally installed on the top side edge of the interior of the oven, with a field of view of the oven rack from the side over the oven rack. In some embodiments, the camera is installed on the exterior of the compartment in which the food is cooked, and points at the location of the food item through a transparent window (e.g., a thermal insulating window). In some embodiments, the camera is placed outside of the compartment or over platform on which the food items will be placed.

In some embodiments, cooking appliance 200 also includes one or more heating units 143 (e.g., shown as heating units 216-1, 216-2, and 216-3 in FIG. 2A). For example, heating units 216-1, 216-2, and 216-3 may be three heating coils or three sections of an induction cooking surface. In some embodiments, heating units 216-1, 216-2, and 216-3 can be separately controlled to heat different portions of the cooking compartment or cooktop of food preparation system 200. Each heating unit is configured to respectively heat a predetermined area of the cooking compartment of food preparation system 200 so that different areas of the cooking compartment or stovetop can have different temperatures or heat up at different rates. This may be desirable for simultaneously cooking different types of food. For instance, heating unit 226-1 may be set at a first temperature or power for cooking chicken located in a first area of the cooking compartment and heating unit 226-2 may be set at a second temperature or power for cooking vegetables located in a second area of the cooking compartment so that the chicken and vegetables may be cooked concurrently at different temperatures and/or with different rates. In some embodiments, the positions and orientations of the one or more heating units 216 are movable and have adjustable parts such that they can be moved within the cooking compartment.

In some embodiments, cooking appliance 200 also includes display 220, serving as display 144 as described in FIGS. 1B and 1C. In some embodiments, display 220 is also a user interface (e.g., see FIGS. 1B and 1C, user interface 146) that allows users to input information (e.g., set a timer, start the appliance, set the temperature, set the cooking mode, snap a picture of the food items, query cooking status of food items, etc.) as well as receive information from food preparation system 200 (e.g., current temperature in cooking compartment/stovetop, time lapsed, food item identity, quantity, appearance, cooking progress level, predicted cooking results, cooking action recommendations, etc.).

In some embodiments, cooking appliance 200 also includes controls 226 (e.g., control knobs 226-1, 226-2, 226-3) that are used to adjust the cooking parameters of food preparation system 200 (e.g., adjust the power output of the heating units, cooking method, cooking temperature, heat distribution, cooking time). For example, control knob 226-1 may be used to control the temperature of heating unit 216-1. In some embodiments, controls 226 includes one or more of buttons, knobs, and touch-screen controls that respond to manual adjustments and to the control instructions (e.g., control instructions received from appliance-function control module 153, 153', or 153"). In some embodiments, controls 226 are incorporated into the display and user interface of food preparation system 200, as described above, such that the display and user interface allows the user to control and adjust the cooking functions and cooking parameters of food preparation system 200. For example, a user may input a desired temperature on the display of an oven and the oven may display the current temperature of the oven as well.

Referring to FIG. 2B, cooking appliance 200 (e.g., serving as appliance 140, or appliance 140') may include, but is not limited to, a toaster oven 201, a microwave oven 202, a rotisserie oven 203, and an electric cooktop 204. In some embodiments, cooking appliance 200 may be a multi-functional appliance that can perform one or more cooking functions (e.g., a convection oven that may have bake, broil, and steam functions).

Figure 3:
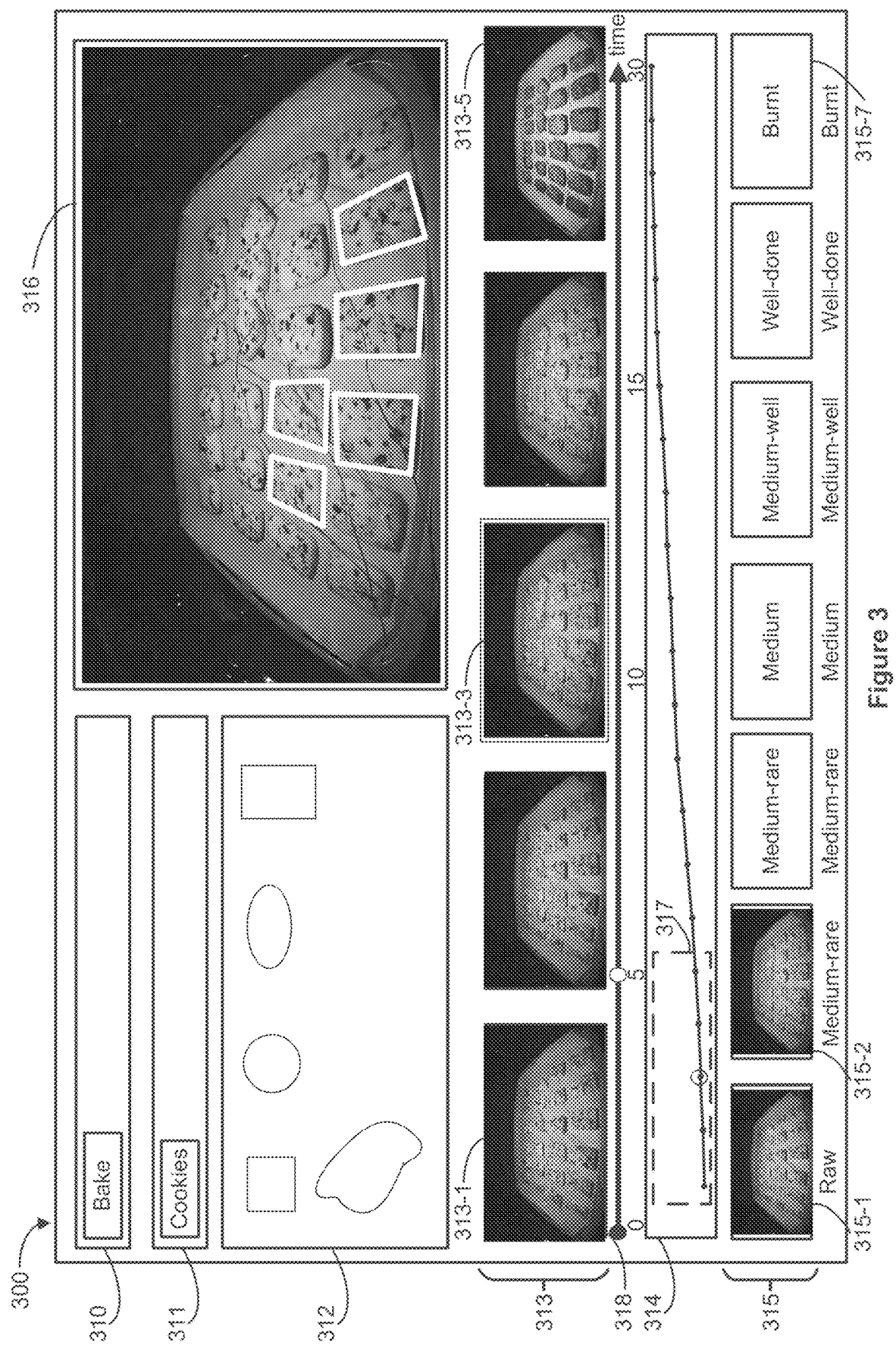
FIG. 3 illustrates an annotation user interface of a food preparation system in accordance with some embodiments.

FIG. 3 illustrates a user interface corresponding to a food preparation system in accordance with some embodiments. Annotation user interface 300, as shown in FIG. 3, displays raw sensor data and annotation options in accordance with a cooking process. In some embodiments, annotation user interface 300 includes cooking method input region 310, food item type input region 311, food item outline selection region 312, cooking image gallery 313, structured data display region 314, cooking progress level annotation region 315, and food item outline adjustment region 316. In some embodiments, annotation user interface 300 corresponds to an instance of cooking appliance 200 of a food preparation system, and displays raw (unannotated) sensor data and annotation options for food items that are being cooked or have been cooked by cooking appliance 200. In some embodiments, annotation user interface 300 may be displayed on a user device (e.g., user device 111, 113, or 115), or on display 144 of appliance 140 or 140'. In some embodiments, annotation user interface 300 or a simplified version of user interface 300 (e.g., for review and approval purposes, the annotation user interface 300 omits the image gallery 313) may be displayed on a display of an annotation station 128.

In some embodiments, cooking method input region 310 indicates a cooking method used for the imaged cooking process. In some embodiments, the cooking method is automatically determined based on the selected function and settings of a corresponding appliance (e.g., appliance 200) of the food preparation system. In some embodiments, cooking method input region 310 provides a user with a list of cooking methods that the user can select from (e.g., the list of cooking methods may include selections such as steam, grill, bake, broil, fry, etc. and a user may simply select one of the cooking method options). In some embodiments, cooking method input region 310 allows a user to type in a cooking method. For example, a user may type in "Bake" to indicate the cooking method of the cooking process. In some embodiments, cooking method input region 310 provides the user with a list of auto-suggested cooking method options that the user can select from once the user has started typing.

Food item type input region 311 indicates the food items that are being cooked in the cooking appliance. In some embodiments, the food item types displayed in the food item type input region 311 are automatically determined from the images of the food items by the food preparation system (e.g., using image processing and deep learning techniques). In some embodiments, food item type input region 311 provides a user with a list of food item types that the user can select from (e.g., white cake, peanut butter cookies, chicken, steak, pizza, carrots, rice, etc.). In some embodiments, food item type input region 310 allows a user to type in one or more food item types corresponding to the food items being cooked in the cooking appliance. For example, a user may type in "carrots" to indicate that the cooking process involves cooking carrots. In some embodiments, food item type input region 311 provides the user with a list of suggested food item types that the user can select from once the user has started typing. In some embodiments, depending on whether a single food item type is entered or multiple food item types are entered in the food item type input region 311, the configuration of the annotation user interface may be changed. For example, if only one type of food items are cooked in the cooking process, the images include only one food item, and all food items can have the same cooking progress level. The user interface allows the user to annotate all food items in the same image with a single input (e.g., dragging a selected cooking progress level label to the image, or dragging the image to a slot corresponding to the selected cooking progress level, and in response to the completion of the drag, the computing system labels all food items in the image individually with that same cooking progress level). In another example, if multiple types of food items are cooked in the cooking process, the food items in the same image may be cooked to different cooking progress levels at a given time. The user interface presents cooking progress labels that the user can drag and drop to the position of each food item in the image to individually annotate the food item with a corresponding cooking progress level. In some embodiments, multiple food items have the same cooking progress level, and the user can select a portion of the image including the multiple food items and drag the portion of the image to an image box for that cooking progress level, to label the multiple food items with that cooking progress level. In some embodiments, when preparing training image packages, each food item type in the image is given a corresponding training image package, and each image package includes representative images including instances of that food item type at each of the preset cooking progress levels. For example, if a set of images each includes steaks on the left side of the image and potatoes on the right side of the images, the annotation interface allows the user to select representative images corresponding to each of seven steak cooking progress levels, and label the left side of the images with the cooking progress levels of the steaks, and the right side of the images with cooking progress; and the annotation user interface allows the user to select representative images corresponding to five potato cooking progress levels, and label the right side of the images with the cooking progress levels of the potatoes. In some embodiments, the images annotated for potato cooking progress levels are included in one annotated data package, and the image annotated for steak cooking progress levels are included in a different annotated data package. In some embodiments, the each of the images are divided into two portions, such that each of the annotated data packages only includes annotation for one type of food items.

Food item outline selection region 312 includes a number of outline shapes (e.g., geometric shapes (e.g., square, oval, circle, triangle, star, tree shape, heart, wedge, stick, cube, disc, etc.) and/or generic shapes for different types of food items (e.g., cauliflower florets, lamb chop shape, carrot shape, shrimp shape, chick drumstick shape, etc.)) for locating and outlining different food items in a raw image (e.g., RGB image, or infrared image) recorded by the one or more second sensors 142 of appliance 200. In some embodiments, food item outline selection region 312 is automatically populated with outline shapes that correspond to the food item type(s) listed in food item type input region 311. For example, after a food item type of "pizza" is specified in the food item type input region 311, food item outline selection region 312 is automatically populated with a circular outline, a semi-circle outline, and a circular sector outline, corresponding to a whole pizza, half a pizza, and a slice of pizza, respectively. In some embodiments, food item outline selection input region 312 displays a variety of outlines that the user can browse through. In some embodiments, the food item outline selection input region 312 includes a freehand drawing tool that allows a user to draw an outline of any shape. The process of outlining food items in an image or video are described in further detail below.

In some embodiments, cooking image gallery 313 includes a plurality of images (e.g., images 313-1, 313-3, and 313-n) recorded by the one or more second sensors 214 of appliance 200. In some embodiments, as shown in FIG. 3, the images are shown as an image sequence arranged in chronological order (e.g., image 313-1 was captured at the start of cooking, at minute 0, and image 313-3 was captured 3 minutes after the start of cooking, 313-5 was captured 5 minutes after the start of cooking). In some embodiments, a fixed number of representative images (e.g., images 313-1, 313-3, and 313-n) are selected from all images taken during the cooking process and displayed in the cooking image gallery 313. The user may select a representative image to see other images captured close to the time of the selected representative image. In some embodiments, a timestamp associated with the time that an image of the plurality of images was captured is also shown under each image in the cooking image gallery. For example, image 313-3 may include a timestamp label to indicate that image 313-3 was recorded at minute 3 of the cooking process. In some cases, the timestamp label for image 313-3 may be displayed when image 313-3 is selected or if a pointer hovers over image 313-3. In some embodiments, timeline 318 displays a timeline that corresponds to the position of the plurality of images (e.g., images 313-1, 313-3, and 313-n) in image gallery 313. In some embodiments, a user may be able to scroll through the cooking image gallery 313 (e.g., cooking image gallery 313 may include more images than those that can fit in the viewable portion of annotation user interface 300 and a user can scroll or scrub through a timeline of the cooking process to view all the images in image gallery 313 related to the cooking process). For example, a cooking process may have a total lapsed time of 30 minutes and the first 5 images recorded between the start (e.g., image 313-1 recorded at minute 0) and minute 5 may be shown on user image gallery 313. A user may scroll through image gallery to browse images recorded at other times within the cooking process (e.g., the user may scroll to the left/right and/or scroll up/down in order to view the other recorded images, or drag a position indicator along a timeline).

Structured data display region 314 displays structured data (such as temperature, weight, humidity, etc.) recorded by the one or more first sensors 212. For example, as shown in FIG. 3, the recorded temperature (e.g., black dots) is shown in structured data display region 314. In some embodiments, as shown, the recorded structured data for the duration of the entire cooking process is shown and an optional window 317 indicates the time frame (e.g., the first five minutes of the cooking progress) that is currently displayed in cooking image gallery 313 is overlaid on the structured data. For example, as shown, structured data display region 314 shows the all temperature data recorded for a 30-minute cooking process. Optional window 317 outlines temperature data recorded between minute 0 and minute 5, corresponding to the images shown in image gallery (e.g., images 313-1, 313-3, and 313-5). In some embodiments, not shown, structured data display region 314 displays the recorded structured data over the time period shown by images in image gallery 313. For example, structured data display region 314 shows temperature data recorded between minute 0 and minute 5, corresponding to the images shown in image gallery (e.g., images 313-1, 313-3, and 313-5).

In some embodiments, cooking progress level annotation region 315 displays a predetermined selection of cooking progress levels that a user can select from to annotate structured and unstructured data captured at appliance 200. In some embodiments, cooking progress level annotation region 315 may update the selection of cooking progress levels based on the food item type(s) listed in food item type input region 311. For example, cooking progress level annotation region 315 may display seven levels of doneness, ranging from raw (e.g., box 315-1) to burnt (e.g., box 315-7) and including categories such as rare and medium-rare, when steak is listed in the food item type input region. In some embodiments, as shown, the cooking progress levels are labeled using cue words such as "medium-well". In some embodiments, not shown, the cooking progress levels may be labeled using numerical values (e.g., 1=raw, 10=burnt). Although seven preset cooking progress levels are shown in FIG. 3, any number of preset cooking progress levels may be displayed. The process of annotating structured and unstructured data with cooking progress levels is described in further detail below.

To illustrate the process of collecting and annotating data in a food preparation system (e.g., food preparation system 101 and 102), a more specific example scenario is provided below. In an example, a user has placed a number of cookies on a tray on the oven rack in a smart oven (e.g., appliance 200, which may correspond to appliance 140 or 140'). The smart oven is set to a bake function and preheated to a first temperature (e.g., the one or more heating units are activated to heat the cooking compartment). The smart oven may display (e.g., through display 144 or user interface 146) the current temperature of the smart oven. Once the cooking process is initiated (for example, through detection that food is present the cooking compartment of smart oven, by the user starting a timer, or by the user pressing a start button, etc.), the smart oven begins recording the temperature (e.g., structured data) and capturing raw images (e.g., unstructured data) of the oven rack in the cooking compartment. The temperature data and the raw images are recorded at predetermined intervals, for example, every minute. The temperature data and the raw images include a time stamp indicating the time at which the data was recorded (e.g., 5:30 PM, or 10 minutes after the start of the cooking process). In some cases, the temperature data and the images are recorded at the same intervals (e.g., at the same time). In some cases, the temperature data and the images are recorded at different intervals. In some cases, a first temperature sensor may record the temperature at the top of the oven, a second temperature sensor may record the temperature on the left side of the bottom of the oven, and a third temperature sensor may record the temperature on the right side of the bottom of the oven. In some cases, a first camera may capture images of the top oven rack and a second camera may capture images of the bottom oven rack. Once the cooking process is completed (e.g., the food is permanently removed from cooking compartment, the smart oven is turned off, or the one or more heating units are deactivated, etc.), collection of the structured and the unstructured data is complete. The collected structured and unstructured data are considered to be raw data as they have not been annotated, edited, or categorized. In some embodiments, the raw data are captured and transmitted to a user device or displayed on the oven for annotation during the cooking process. In some embodiments, the annotation takes place after all of the raw data corresponding to a respective cooking session is completed.

In this example, after data collection is complete, the collected raw data for the cooking process described above can be displayed on an annotation user interface (e.g., annotation user interface 300, either displayed by display 144 of the smart oven or displayed by a user device corresponding to the smart oven). The method of cooking is shown in cooking method input region 310. In this example, the food was cooked using a bake function of the smart oven. Cooking method input region 310 of annotation user interface 300 automatically lists "Baking" based on the settings of the smart oven associated with the cooking process. The food item types are listed in food item type input region 311, and various outline options (e.g., oval, square, rectangle, freeform, etc.) are shown based on the listed food item types. The raw images captured by the cameras in the smart oven are shown in cooking image gallery 313 and the raw temperature data recorded by the temperature sensors are shown in structured data display region 314. When an image (e.g., image 313-3) from cooking image gallery 313 is selected, the image is shown in food item outline adjustment region 316. The user can select an outline (e.g., a default cookie shape) and drag it to image 313-3 displayed in outline adjustment region 316 in order to outline the food items shown in image 313-3. For example, the user may drag a rectangle outline onto each of the cookies shown in image 313-3. The user may further adjust the shape of the outlines (e.g., by moving the outline handles) to match the shape of the cookies. The user may repeat this process of outlining the different food items in each of the images selected for different cooking progress levels. The user may also annotate image 313-3 to indicate that the cookies shown in image 313-3 are less than half-way cooked by dragging image 313-3 to the doneness level marked "medium-rare" (e.g., box 315-2) in cooking progress level annotation region 315 or by dragging box 315-2 to image 313-3. In some embodiments, if multiple food items in an image needs to be labeled with different cooking progress levels, the user can drag the boxes corresponding to the appropriate cooking progress levels individually to each of the food items to annotate the food items individually. In some embodiments, if a group of food items have the same cooking progress levels, the user can select a portion of the image that includes all of the food items with the same cooking progress level, and drag the selected portion of the image to the box representing the corresponding cooking progress level. As a result of the user's inputs on the annotation user interface, each food item in each of a subset of images are labeled with a respective cooking progress level.

After the data collection and data annotation are completed, the annotated data may be sent to an annotation station (e.g., annotation station 128) where the annotated data may be reviewed or further annotated before being approved. Once the annotated data is approved, the approved data may be sent to training set server 120 or training model server 122. Further details regarding training sets, training models, training set server 120, and training model server 122 are provided below with respect to other parts of this disclosure. In some embodiments, each data package includes a respective image corresponding to each cooking progress level of a set of preset cooking progress levels for the type of food item included in the image, each food item included in the image has a corresponding food item type, (optional cooking method), a set of location coordinates corresponding to the location of the food item in the image, a description of the outline of the food item in the image, and a corresponding cooking progress level for the food item in the image. More details of the data collection and annotation aspect are described with respect to FIG. 7.

Figure 4:
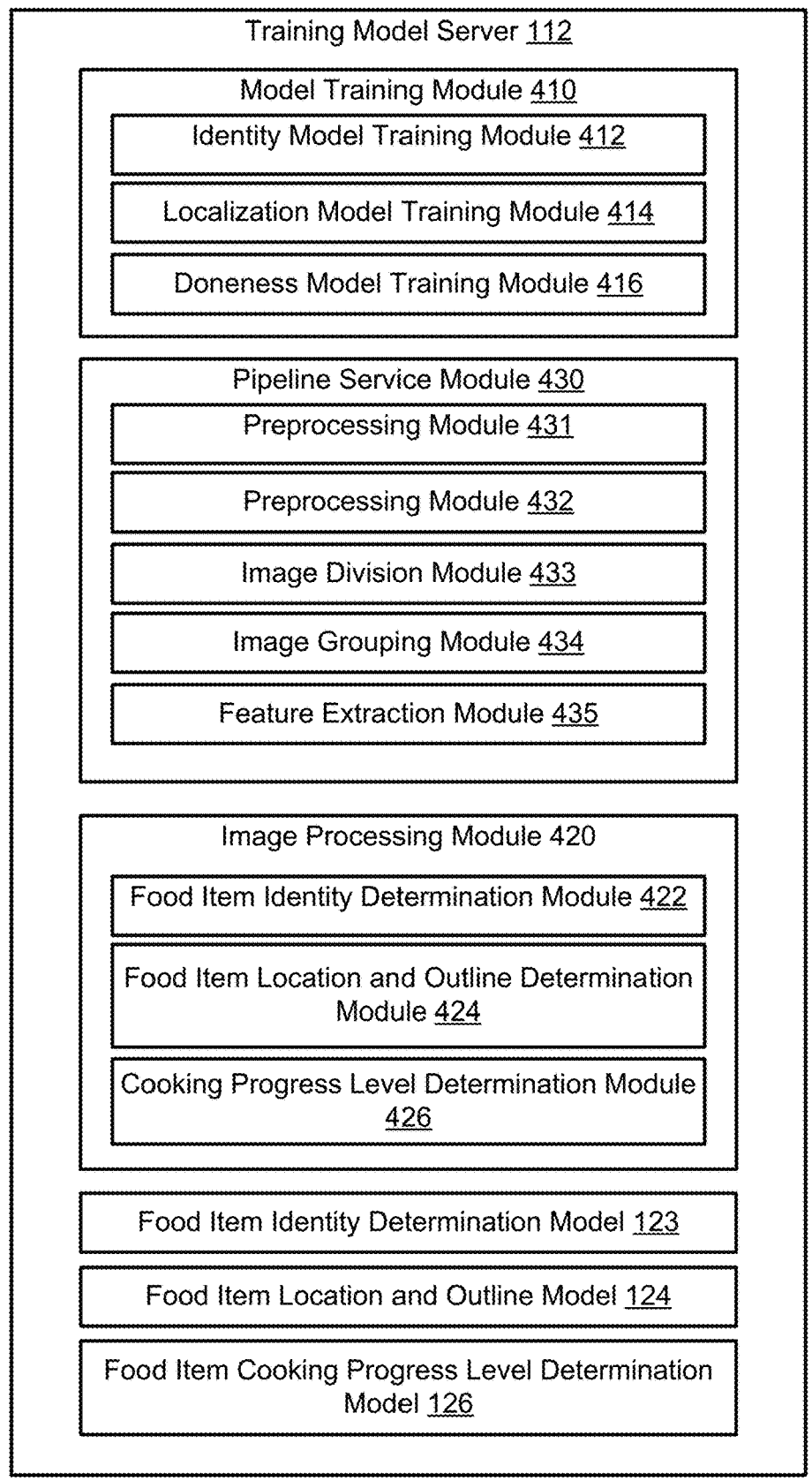
FIG. 4 shows a block diagram of a training model server of a food preparation system in accordance with some embodiments.

FIG. 4 shows a block diagram of a training model server 122 of a food preparation system in accordance with some embodiments.

Training model server 112 is configured to develop image processing models (e.g., food item identity determination models 123, food item location and outline determination models 124, and food item cooking progress determination models 126) based on annotated data received from annotation station 128 or training sets (which may include annotated data) received from training set server 120. Training model server 112 is further configured to use the image processing models to determine food item identities, locations, outlines, and cooking progress levels for images received from cooking appliances in-real time, and optionally provide control instructions in accordance with the obtained results of the image processing.

In some embodiments, the training model server 112 includes model training module 410 (e.g., for training the food item identity determination models 123, food item location and outline determination models 124, and food item cooking progress determination models 126) and image processing module 420 that uses the trained image processing models to determine food item identities, locations, outlines, and cooking progress levels for images received from cooking appliances in-real time. In some embodiments, the image processing module 420 is part of computing system 160, e.g., serving as or utilized by the server-side location and outline determination module 149" and server-side cooking progress monitoring module 153". In some embodiments, some or all of the functions the image processing module 420 are implemented in computing system 130 and/or cooking appliance 140, or 140'.

In some embodiments, the training model server 112 further includes a number of pipeline service modules 430, including preprocessing module for localization model 431, preprocessing module for doneness model 432, image division module 433, image grouping module 434, and feature extraction module 435, that are utilized by the model training module 410 and the image processing module 420 to perform preprocessing and intermediate steps of the training and/or image processing functions. More details of the preprocessing module for localization model 431, preprocessing module for doneness model 432, image division module 433, image grouping module 434, and feature extraction module 435 will be discussed in more detail with respect to the functions of other modules, and the image processing pipeline for various types of determinations.

In some embodiments, the model training module 410 further includes identity model training module 412, localization model training module 414, and doneness model training module 416. In some embodiments, the image processing module 420 further includes food item identity determination module 422, food item location and outline determination module 424, and cooking progress level determination module 426.

In some embodiments, the preprocessing module for localization model 431 is configured to request and received annotated images for each food item type to be included in the location and outline determination model 124 from the training set server 120, and prepare test images received from user devices or appliances in a manner such that they can be provided as input to the location and outline determination model. In some embodiments, the preprocessing module for localization model 431 provides a test image to the food item identity determination module 422 for using the food item identity determination model 123 to determine the identities of the food items in the test image, and the result of the food item identities are provided to the food item location and outline determination module 424 to reduce computation time for the location and outline determination using the food item location and outline determination models 124.

In some embodiments, the preprocessing module for doneness model 432 is configured to request and received annotated images for each food item type to be included in the location and outline determination model from the training set server 120, and prepare test images received from user devices or appliances in a manner such that they can be provided as input to the cooking progress level determination model 126. In some embodiments, the preprocessing module for doneness model 432 provides input images (e.g., training images and test images) to the image division module 431 and image grouping module 433 to correlate portions of images corresponding to the same food item across multiple images, and use the feature extraction module 435 to prepare input for the cooking progress level determination model 126. In some embodiments, image division module 431 is configured to divide an annotated image or a test image into separate images corresponding to individual food items, based on the result of food item location and outline determination from the localization model 124. In some embodiments, image grouping module 433 is configured to collect the separate images of each food item in a cooking process, categorize the separate images by food types, and/or by food item identifier (e.g., items detected at the same location in the cooking appliance during a cooking process).

In some embodiments, identity model training module 412 is configured to train and update the food item identity determination model 123 based on preprocessed annotated training images received from the training set server 120. In some embodiments, the localization model training module 414 is configured to train and update the localization model based on preprocessed training images provided by the preprocessing module for localization model 431. In some embodiments, the doneness model training module 416 is configured to train and update the doneness model based on preprocessed difference feature tensors provided by the preprocessing module for doneness model 433.

In some embodiments, food item identity determination module 422 is configured to utilize the identity determination model 123 to determine identities of food items in a test image after the test image is preprocessed by the preprocessing module for localization model 431. In some embodiments, the food item location and outline determination module 424 is configured to utilize the localization model 124 to determine the locations and outlines of food items in a test image after the test image is preprocessed by the preprocessing module for localization model 431. In some embodiments, the cooking progress level determination module 426 is configured to utilize the doneness model to determine the cooking progress level of food items in a test image based on preprocessed difference feature tensors provided by the preprocessing module for doneness model 433.

Other functions and components of the training module server 112 are described with respect to other parts of this disclosure and/or are apparent to a person skilled in the art in light of the present disclosure.

Figure 5A:
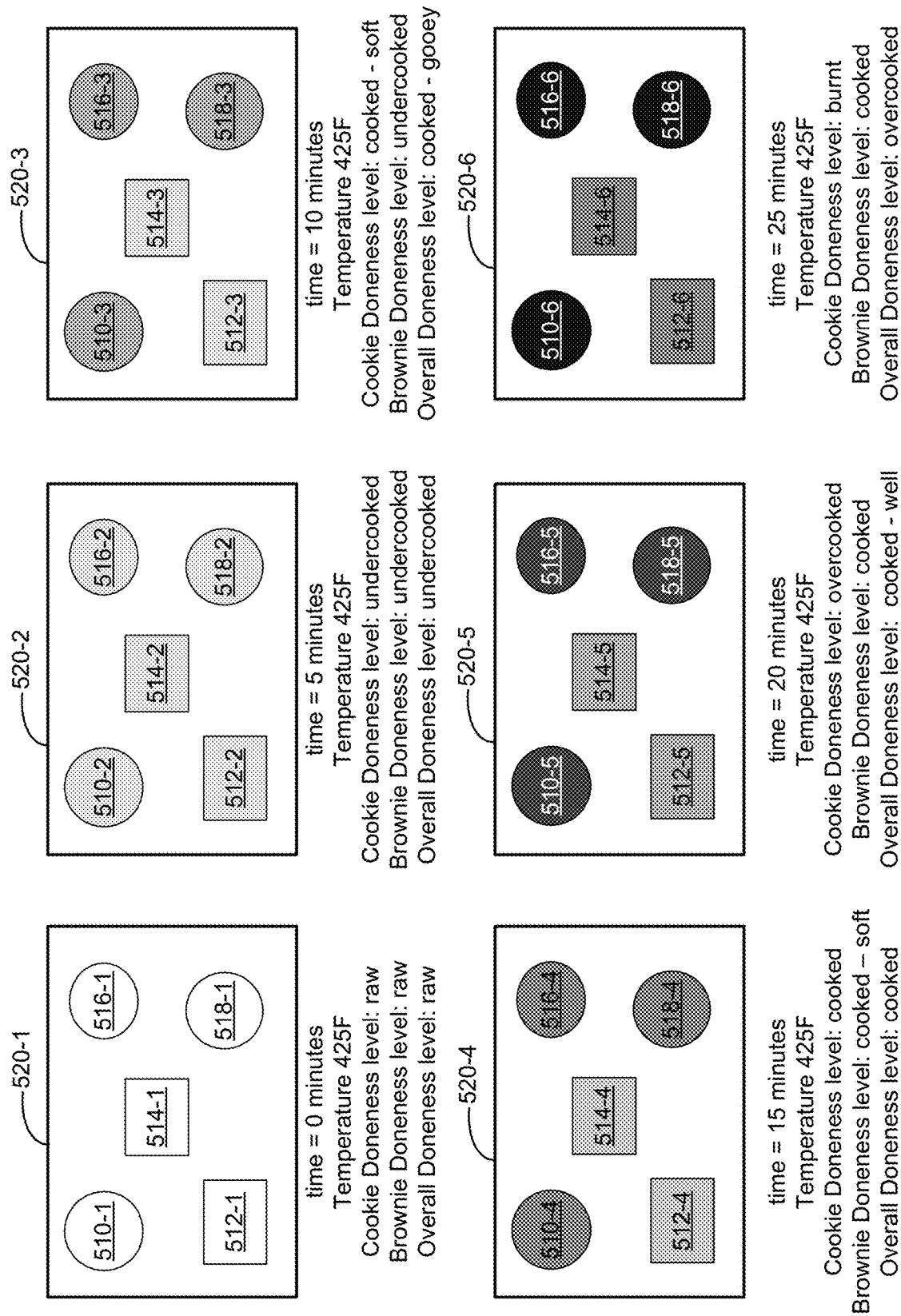
FIG. 5A illustrates annotated images corresponding to a cooking process of a cooking appliance in accordance with some embodiments.

FIG. 5A shows a diagram of annotated images corresponding to a cooking process of a food preparation system in accordance with some embodiments. FIG. 5 provides an example of images (e.g., images 520-1, 520-2, 520-3, 520-4, 520-5, and 520-6) captured by a camera (e.g., one or more second sensors 412) during a cooking process and packaged into a training image set. The six images have been annotated (e.g., by a user) and each of the six images includes corresponding structured data (e.g., temperature), time stamp, and annotated cooking progress levels. In some embodiments, a cooking progress level can be annotated for each of the food items (e.g., brownie, 512, brownie 514, etc.) in the image. In some embodiments, a cooking progress level can be annotated for each food type (e.g., brownie, cookie, etc.) in the image. In some embodiments, an overall cooking progress level can be annotated for the entire image. In the example shown in FIG. 5A, the images are recorded at 5 minute intervals over a 25-minute total cooking time for a cooking process of two brownies (e.g., brownies 512 and 514) and three cookies (e.g., cookies 510, 516, and 518). Image 520-6 shows an image of the five food items at a cook time of 25 minutes. The annotation data indicates that the cookies are burnt (evidenced by dark coloring) and that the brownies are cooked. The annotation data also indicates an overall doneness level of "overcooked." In some cases, the overall doneness level is a weighted average of the doneness level of all the items shown in the image. The images in this data package along with the associated annotation data, e.g., including food item identity data, food item location and outline data, cooking progress level data, can be added to the training corpus used to train the food item location and outline determination model 124, for example.

Figure 5B:
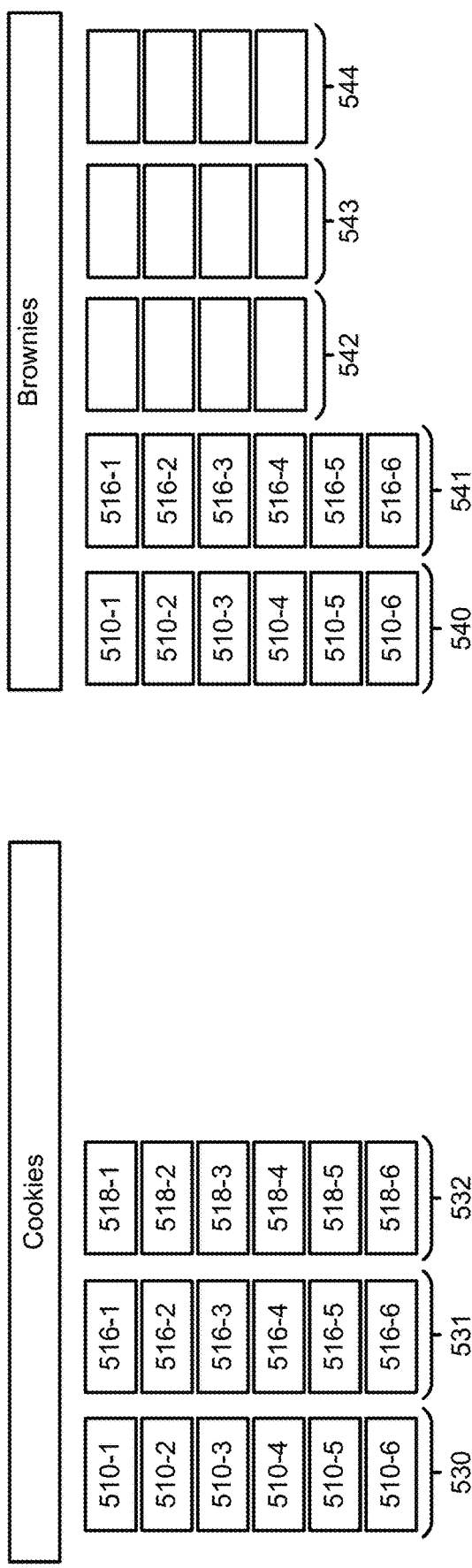
FIG. 5B is a block diagram illustrating an image division and grouping process performed by a training set server of a food preparation system in accordance with some embodiments.

FIG. 5B shows a block diagram of an image division and grouping process of a food preparation system in accordance with some embodiments. The grouping process is performed to correlate the images of each individual food item during a cooking process, such that a data set is generated for each food item. The data set can be used for training the cooking progress level determination model 124.

In a first example, training set server 120 or training model server 112 receives the six annotated images in FIG. 5 in a data package from a user device, an appliance, or an annotation station. In the case where the data package represents a training image set, for each of the received images, identities of the food items and the locations and outlines of food items in each image are already known (e.g., as the annotation data), the division module 423 separates the image containing the two brownies (e.g., brownies 512 and 514) and three cookies (e.g., cookies 510, 516, and 518) into five separate images, one image for each food item (e.g., image 520-1 is divided into five separate images: cookie 510-1, brownie 512-1, brownie 514-1, cookie 515-1, and cookie 518-1), based on the outlines in the annotation data for the image. This dividing process is repeated for each image in the data package, resulting in 30 separate images total. Grouping module 424 categorizes all the brownie images as a brownie food type and all the cookie images as a cookie food type (e.g., of the 30 separate images, there are 12 brownie images and 18 cookie images). Grouping module 424 further groups the images into respective image sets that correspond to each food item (e.g., image set 530 contains 6 images of cookie 510, image set 540 contains 6 images of brownie 512, and so forth) by correlating the images based on the location of the food item in the original undivided images containing multiple food items. An image set output by the grouping process corresponds to a single food item and include images representative of the state of the food item as it progresses through the cooking process (start to finish). The image set also has corresponding structured data (such as temperature), annotations, and timestamps are included in the image set so that each image of the image set can be correlated to a temperature, a lapsed cooking time, and a doneness level (as annotated by a user). In some embodiments, as shown in this example, the annotated image package for one cooking process may be converted to more than one training image set (e.g., in this example, one cooking process has resulted in two brownie image sets, image set 530 and 531, and three cookie image sets, 540, 541, and 542, a total of five image sets). FIG. 5B shows five image sets for the brownie food type (e.g., image sets 540-544). Image sets 540 and 541 are from the same cooking process, as described above. Image sets 542, 534, and 535 may be from different annotated data package for other cooking processes.

The image data sets 540, 541, 542, 543, and 544 can then be used by the training model server to train the cooking progress level determination model 125.

In some embodiments, before the training is started, the image data sets 540, 541, 542, 543, and 544 are each processed by the feature extraction module 431. For example, for image data set 540 that includes images of a single brownie 510-1 at various levels of doneness, feature extraction module 421 uses the images in the image data set 540 to generate six difference feature tensors, including a first difference feature tensor based on image 510-1 and image 510-1 (same image), a second difference feature tensor based on image 510-1 and 510-2, a third difference feature tensor based on image 510-1 and image 510-3, a fourth difference feature tensor based on image 510-1 and 510-4, a fifth difference feature tensor based on image 510-1 and 510-5, and a sixth difference feature tensor based on image 510-1 and 5106. Each of the six difference feature tensor are annotated with the annotation data corresponding to the latter of the two images used generate the difference feature tensor. The annotation data for each difference feature tensor includes a respective cooking progress level, cooking time, temperature, thermal map, etc. for the latter of the two images that were used to generate the difference feature tensor. Based on the results of feature extraction module 435, doneness model training module 416 can train and update the doneness models 126 to improve the system's ability to determine cooking progress levels of different food types.

Figure 5C:
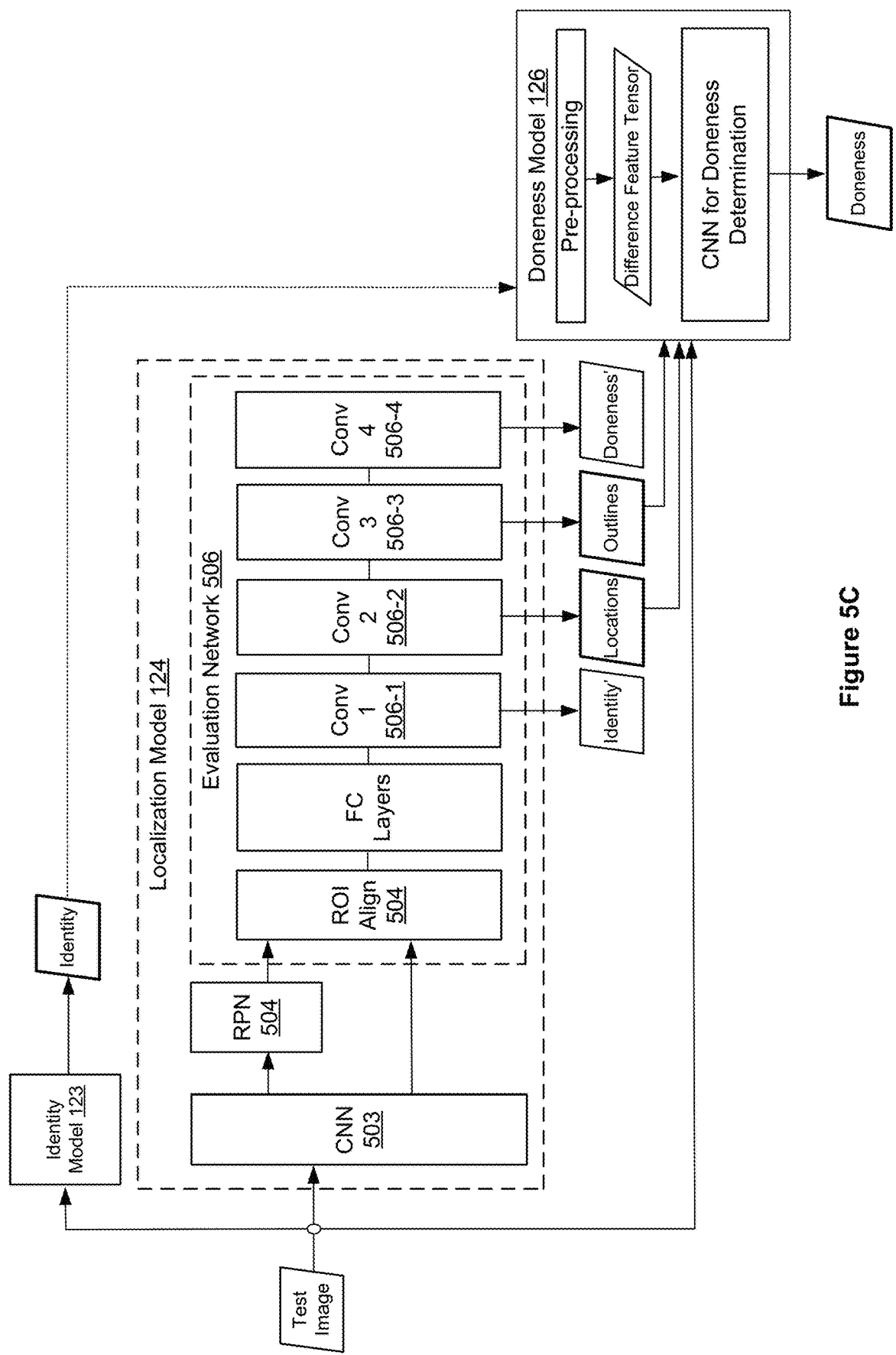
FIG. 5C is a block diagram illustrating a food item locating and outlining process performed by the training model server of a food preparation system in accordance with some embodiments.

FIG. 5C illustrates an image processing pipeline 500 for determining food item identities, food item locations and outlines, and cooking progress levels of food items in accordance with some embodiments. In some embodiments, the processes in the image processing pipeline 500 is performed by training model server 112, after a test image 501-1 is received from a cooking appliance. If the test image 501-1 is the first image taken of a cooking process, the first image is used to establish a baseline state for each food item in the image for the cooking process. In some embodiments, a unique session identifier is established for the cooking process and returned to the cooking appliance, and a unique identifier is assigned to each food item identified in the first image. For example, at the start of a cooking process, a first test image is received along with other corresponding structured data (e.g., temperature, cooking method setting, time, weight, etc.), food item identity determination, and food item location and outline determination are performed on the first test image using the identity model 123 and the localization model 124, respectively.

In some embodiments, as shown in FIG. 5C, the food item identity determination is performed in parallel to the food item location and outline determination. In some embodiments, the food item identity result from the food item identity determination model 123 and a baseline doneness level (e.g., "raw" or "0") are provided as constraints (e.g., as results for the identity and cooking progress level output values) to the location and outline determination model 124 along with test image 501 as the input. The locations and outlines of food items in test image 501 are determined by location and outline determination model 124.

As shown in FIG. 5C, in some embodiments, the location and outline determination model 124 includes a convolution neural network (CNN) 503 that takes the test image 501 as input and outputs a feature map for the test image. The location and outline determination model further includes a region proposal network 504 (e.g., another CNN) that takes the feature map as input and outputs one or more regions of interest (ROIs) for the test image. The location and outline determination model 124 further includes an ROI alignment layer(s) 505 followed by a number of fully connected activation layers, including a first activation layer 506-1 for identity determination output, a second activation layer 506-2 for location determination output, a third activation layer 506-3 for outline determination output, and a fourth activation layer 506-4 for cooking progress level determination output. Each of the activation layer 506 has a corresponding loss function, and during each pas through the model, the results for the different activation layers are evaluated by their corresponding loss functions and the parameters of the model 124 are adjusted accordingly to reduce errors on the different layers and achieving final convergence of the results on the different result layers. In some embodiments, the localization model is implemented using faster RCNN with ROI align, that is modified to include four different convolution layers at the end for the four different types of results. The results for food item identity and cooking progress level are optionally not used and only provides further constraints to improve accuracy of the location and outline determination and faster convergence speed.

As shown in FIG. 5C, once the locations and outlines of food items in the test images are determined, a baseline image for each food item can be produced. As this point, a baseline feature tensor for each food item can be generated using a convolution neural network (e.g., a CNN), and food item cooking progress level for each food item in a subsequently received image in the same cooking process can be determined relative to the baseline image for the food item.

Continue with the example, suppose that a second test image 501-2 is received from the same cooking appliance after some time during the same cooking process. The second test image is associated with the first test image based on the session identifier of the cooking process that was assigned to the cooking process. The food item identity determination does not need to be performed again for the food items in the second test image 501-2, assuming that the food items remain at substantially the same locations in the test images 501-1 and 501-2 during the cooking process. The second test image 501-2 is provided to location and outline determination model 123 as input, and results for food item identity, food item location, food item outline, and cooking progress level for each food item in the second test image 501-2 are output respectively from layers 506-1, 506-2, 506-3, and 506-4. In some embodiments, the cooking progress level result from the location and outline determination model 124 is used by the cooking progress level determination model 126 as a starting value for the model, to reduce running time and improve rate of convergence.

In some embodiments, once the locations and outlines of individual food items in the second test image 501-2 are determined, an image for each food item can be produced. As this point, a feature tensor for each food item at the current cooking progress level can be generated using the same convolution neural network (e.g., a CNN) that was used to generate the baseline feature tensor for the same food item. A difference feature tensor is determined for each food item by subtracting the current feature tensor and the baseline feature tensor for the food item. A respective food item in the first test image and a respective food item in the second test image are determined to be the same food item if it is determined that their location coordinates and outlines are substantially the same in the two images. Once the difference feature tensor is determined for each food item in the second test image, the difference feature tensor is provided as input to the cooking progress level determination model 126 to determine the current cooking progress level for the food item as captured in the second test image.

As additional test images are received from the same cooking process, the cooking progress level of each food item is determined in accordance with the process set forth above, with the baseline feature tensor unchanged for each food item. Once a preset cooking progress level (e.g., 90% done) is determined from a test image for the whole image or for a sufficient number of food items, the training model server generates an alert or control instruction accordingly and send it to the appliance for presentation to the user or for adjusting the operation of the appliance.

Figure 6:
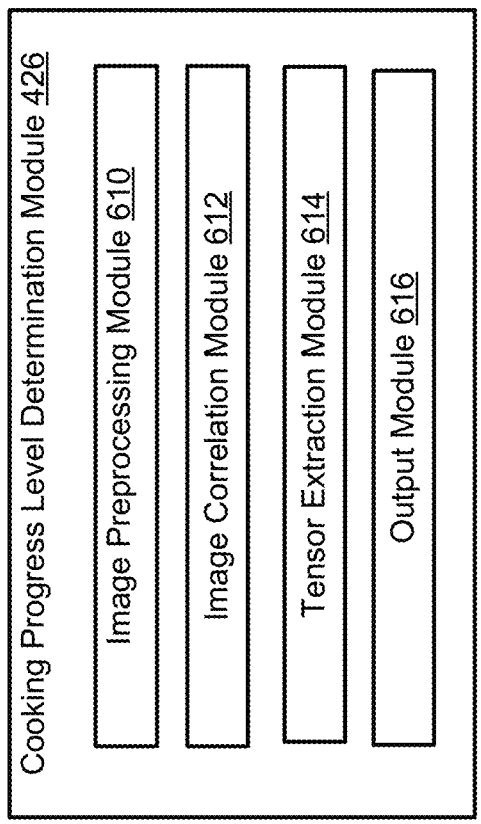
FIG. 6 shows a block diagram of a cooking progress level determination module of the training model server of a food preparation system in accordance with some embodiments.

FIG. 6 shows a block diagram of a cooking progress level determination module 426 of a training model server of a food preparation system in accordance with some embodiments.

Cooking progress level determination module 426 is configured to determine the doneness of food items cooked by a cooking appliance (e.g., appliance 110, 112, 114). In some embodiments, cooking progress level determination module 426 is implemented by a cooking appliance, or a server of a smart home environment, rather than the training model server.

In some embodiments, cooking progress level determination module 426 includes an optional image preprocessing module 610, configured to preprocess images for analysis. The function of image preprocessing module 610 is analogous to preprocessing module 432 in FIG. 4, if preprocessing module 432 does not already exist on the device (e.g., when module 426 is implemented on an appliance, as opposed to training model server 122).

In some embodiments, cooking progress level determination module 426 further includes an image correlation module 612, configured to identify portions of the test image and correlate each of the portions with a corresponding food item identifier that has been assigned to a respective food item in a baseline image from the same cooking process. In some embodiments, the image correlation module 612 utilizes the food item location and outline determination model 124 to determine the locations and outlines of food items in a test image and a baseline image, and correlate the food items at roughly the same location and with substantially the same outline in the two images as images corresponding to the same food item. The portions of images corresponding to the same food item in the same cooking process are identified by the image correlation module 612 and labeled as such.

In some embodiments, cooking progress level determination module 426 further includes a tensor extraction module 614, configured to generate a feature tensor for each food item in each test image (including the baseline test image) of the same cooking process based on the portion of the test image corresponding to the food item. In some embodiments, the tensor extraction module 614 further generates the difference feature tensor for each food item in a test image by subtracting the feature tensor of the food item in the currently processed test image from the feature tensor of the same food item in the baseline image.

In some embodiments, cooking progress level determination module 426 further includes an output module 616 for inputting the difference feature tensor corresponding to each food item in a test image and other relevant annotation data corresponding to the test image or to the food item (e.g., temperature, cooking method, weight, thermal map, etc.) into the cooking progress level determination model 126, and obtain output result of the cooking progress level for each of the food items in the test image.

In some embodiments, the cooking progress level determination module 426 sends the result to an appliance-function control module where a control instruction or alert is generated based on the cooking progress level(s) output by the cooking progress level determination module 426.

In an example, a smart oven may be cooking a batch of cookies in a cooking process that records structured and unstructured raw data every 2 minutes. When the raw data is recorded at minute 6, cooking progress monitoring module 149, which utilizes the cooking progress level determination module 126, may outline and divide the recorded raw image, as described above, that the cookies in the smart oven are currently at a doneness level of "undercooked." The process may be repeated for each set of raw data recorded by the smart oven in this cooking process. In some embodiments, the smart oven continues to capture images of the food items during cooking or reheating of the food items, grades the food items for doneness and appearance, and automatically adjusts the cooking temperature and cooking time based on the current appearance of the food item and/or the determined doneness level of the food item. In some embodiments, the smart oven generates an alert when the image of the food item indicates that the food item has been cooked to the right amount of doneness, and should be removed from the cooking compartment. In some embodiments, when the smart oven has determined that the cookies have a doneness level of "cooked," the smart oven may send an alert to the user (e.g., in the form of an audio alert, or a text message sent to a user device). In some embodiments, when the smart oven has determined that the cookies have a doneness level of "cooked," the smart oven is automatically turned off. In some embodiments, when the smart oven has determined that the cookies have a doneness level of "cooked," the smart oven moves the cookies to a predetermined "cooling area" of the smart oven.

Other details of the food preparation system are described in other parts of the disclosure and is not repeated here in the interest of brevity. It should be understood that the particular components that have been described and the order in which the operations have been described are merely exemplary and are not intended to indicate that the described components and order are the only components of the system or the only order in which the operations could be performed. One of ordinary skill in the art would recognize that a system may include more or fewer components than those described, and recognize various ways to reorder the operations described herein. Additionally, it should be noted that details of various embodiments described herein are also applicable in an analogous manner to other embodiments described herein.

Figure 7:
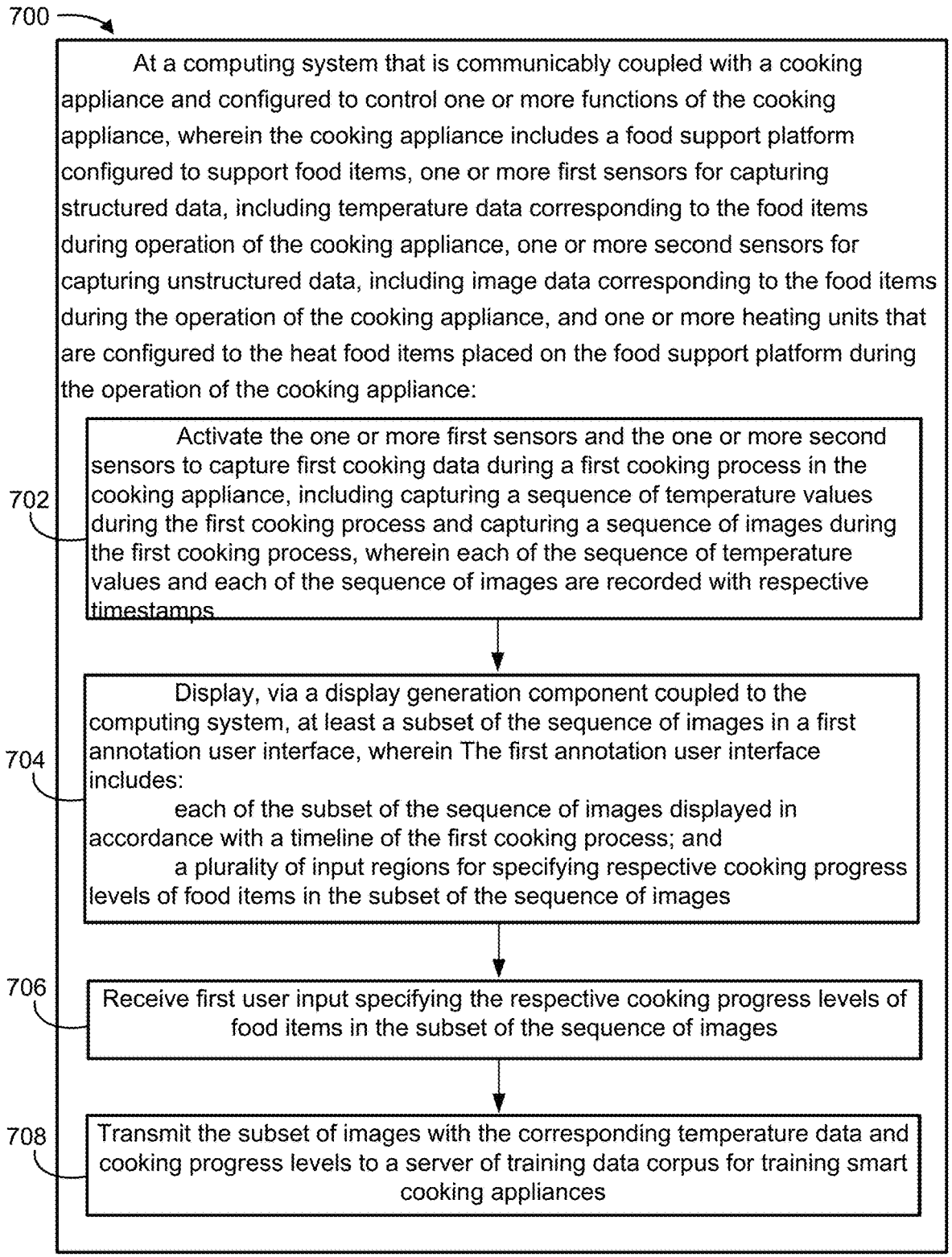
FIG. 7 is a flowchart of a method of collecting and annotating data in a food preparation system in accordance with some embodiments.

FIG. 7 is a flowchart of a method 700 of collecting and annotating data in a food preparation system in accordance with some embodiments. In some embodiments, the method 700 is performed by a computing system (e.g., computing system 130, 160, or 130') having one or more processors and memory.

In accordance with some embodiments, the computing system is communicably coupled with a cooking appliance (e.g., appliance 110, 112, 114, 140, or 140') and configured to control one or more functions of the cooking appliance. In some embodiments, the computing system is a control unit that is integrated with the cooking appliance in a smart cooking appliance (e.g., appliance 140', such as a smart oven, a smart microwave, a smart barbecue, a smart stovetop, etc.) and the computing system controls the cooking functions of the cooking appliance (e.g., appliance 200) and the functions of the cameras (e.g., one or more second sensors 142). In some embodiments, the computing system is implemented separately from the cooking appliance (e.g., appliance 140, the cooking appliance is a smart cooking appliance and has built-in control unit that performs the control functions of the cooking appliance), and communicates with the cooking appliance over a network (e.g., network 190, such as a local area network of a home or a wide area network). The cooking appliance includes a food support platform configured to support food items (e.g., food support platform 210, such as a rack in an oven or toaster oven, a pan on a stovetop, a plate in a microwave oven, a basket in an air fryer, etc.), one or more first sensors (e.g., one or more first sensors 141) for capturing structured data, including temperature data corresponding to the food items during operation of the cooking appliance (e.g., such as temperature sensors for determining temperature(s) in the cooking chamber or on the cooking surface, and/or inside of the food items), one or more second sensors (e.g., one or more second sensors 142) for capturing unstructured data, including image data corresponding to the food items during the operation of the cooking appliance (e.g., images captured by cameras (e.g., RGB camera(s) and/or infrared camera(s), depth camera(s), etc.) with a field of view directed to food support platform 210), and one or more heating units that are configured to the heat food items placed on the food support platform during the operation of the cooking appliance.

The computing system also includes one or more processors and memory that store instructions. When the instructions are executed by the one or more processors, the computing system is configured to activate (702) the one or more first sensors and the one or more second sensors to capture first cooking data during a first cooking process in the cooking appliance (e.g., in response to detecting start of the first cooking process in the cooking appliance (e.g., detecting opening of the door of a cooking chamber of the cooking appliance, detecting the heating units of cooking appliance being turned on, detecting a start button of the cooking appliance being activated, etc.)). Capturing first cooking data includes capturing a sequence of temperature values during the first cooking process and capturing a sequence of images during the first cooking process. Each of the sequence of temperature values and each of the sequence of images are recorded with respective timestamps.

The computing system is also configured to display (704), via a display generation component (e.g., a touchscreen, a display, a heads-up display, a projector, etc.) coupled to the computing system, at least a subset of the sequence of images (e.g., images corresponding to different levels of doneness for a type of food item in the cooking appliance) in a first annotation user interface (e.g., an annotation user interface 300 displayed in an app or web interface provided by the manufacturer of the cooking appliance). The first annotation user interface includes each of the subset of the sequence of images displayed in accordance with a timeline of the first cooking process (e.g., the subset of images are images taken at equal time intervals (e.g., total cooking time divided by a number (e.g., 20 or 100), or every 1 minute, or every 10 seconds, etc.) during the first cooking process. In some embodiments, the images are selected based on significant appearance changes of the food items in the images from the previous image (e.g., automatic processing that determines a total pixel difference value between consecutive images taken along the timeline, and selects the image for display if the difference exceeds a threshold value). In some embodiments, the images are manually selected by the user from a complete timeline of the first cooking process (e.g., user sees all images taken during the first cooking process along a timeline, and drags certain images to various slots corresponding to different cooking progress levels (e.g., ten slots for images corresponding 10 doneness levels). The first annotation user interface also includes a plurality of input regions for specifying respective cooking progress levels of food items in the subset of the sequence of images (e.g., the input regions are text input regions for each of the subset of images (e.g., images from 5 different time points along the cooking timeline)). In some embodiments, the input regions are 10 image slots corresponding to 10 different doneness levels to which the user can drag corresponding cooking images from the displayed image timeline (e.g., the user can choose more images in the later stages of cooking, when food cooking process levels change faster). For example, the annotation user interface may include a browse-able list of images captured during the cooking process. The user can inspect each image and select the images that represent different levels of doneness from the list. The user can drag doneness labels (e.g., raw, rare, medium rare, medium, medium well, well done; or 0% cooked, 10% cooked, . . . 90% cooked, 100% cooked, etc.) to the selected images. In some embodiments, if there are multiple food items in the image (e.g., there are multiple cookies over different regions of the cookie sheet), the user optionally is allowed to drag a respective doneness label over to each cookie in the image. The computing system is further configured to receive (706) first user input specifying the respective cooking progress levels of food items in the subset of the sequence of images (e.g., in accordance with the options provided by the annotation user interface, the user manually enter the doneness levels for each food item in each of the subset of images, or the doneness levels for each type of food items in the subset of images, or the doneness levels of food items in the subset of images; or the user drags selects an image for each doneness level of a plurality of preset doneness levels from among all the images captured during the cooking process). In some embodiments, the user can also enter an identification label (e.g., almond cookie, lemon cookie, squash, fish, chicken drumsticks, etc.) for each food item, or food items in a region (e.g., the image may include multiple types of food items in different regions) in the image. In some embodiments, the user is also provided with an opportunity to provide and/or adjust an outline for each food item in the image. The computing system is configured to group (e.g., by using a common filename component, and/or inclusion in the same folder) the subset of images with corresponding temperature data (e.g., identified according to the corresponding timestamps of the images and the temperature data) and cooking progress levels specified by the first user input. The computing system is further configured to transmit (708) the subset of images with the corresponding temperature data and cooking progress levels to a server of training data corpus (e.g., training set server 120 and/or training model server 122) for training smart cooking appliances.

In some embodiments, the computing system is also configured to display, via the display generation component coupled to the computing system, a respective image in the subset of the sequence of images (e.g., the image corresponding to a first level of doneness in the group of images) in a second annotation user interface (e.g., an annotation user interface 300 displayed in an app or web interface provided by the manufacturer of the cooking appliance). In some embodiments, the second annotation user interface has the same interface (e.g., same appearance and function) as the first annotation user interface. The second annotation user interface includes a plurality of outline tools corresponding to different food item shapes. The computing system is further configured to receive second user input specifying a respective outline for each food item in the respective image displayed of the subset of the sequence of images using the plurality of outline tools. In some embodiments, the annotation user interface provides a plurality of default food outlines with frequently used shapes (e.g., shapes selected based on a user specification of the food items identity and/or shape, or automatic ingredient recognition based on various image processing and deep learning techniques). The user optionally drags a suitable food outline to each of the food items in the image. In some embodiments, the food outline is adjustable by one or more handles (e.g., handles attached to corners of a polygonal shape or start shape, or rim of a circular shape, axis of an oval shape, or around a free-form shape, etc.). In some embodiments, standardized irregular food shapes are provided, and the user is permitted to adjust the size and orientation of the shape. For example, if the user specifies a food item identity "chicken drumstick", and standardized drumstick shape is provided as an option, and the user can drag the shape to each specific drumstick captured in the image and adjust the size and/or orientation of the standard shape to fit the shape and orientation of the drumstick in the image. In another example, if the user specifies a food item identity "baked potato wedges", and standardized potato wedge shape is provided as an option in the annotation interface, and the user can drag the wedge shape to each specific potato wedge captured in the image and adjust the size and/or orientation of the standard shape to fit the shape and orientation of the potato wedge in the image. In some embodiments, the food outline annotation is done at a different time from the doneness annotation, e.g., by different people (e.g., doneness assessment requires more cooking expertise and less dexterity, while outline annotation requires less cooking expertise and more dexterity). In some embodiments, the doneness annotation is performed by individual users (e.g., home cooks using the cooking appliance) at home in a distributed manner and the outline annotation is too tedious for those users and is done automatically via image processing or by hired personnel. In some embodiments, the doneness annotation and the outline annotation are done together in the same user interface session, and the outline annotation is further refined later by an expert or hired personnel. In some embodiments, after the user has specified the outlines of food items in a first image of the subset of images, the same outlines are presented over a second image of the subset of images immediately following the first image, and the user can manually adjust these outlines that was automatically presented over the second image to specify the outlines for the second image. The adjusted outlines are then automatically presented over a third image immediately following the second image in the subset of images, and the user can further adjust these outlines manually to specify the outlines for the third image, and so on and so forth.

In some embodiments, the second user input is received after the subset of images are transmitted to the server of training data corpus (e.g., training set server 120 and/or training model server 122) for training smart cooking appliances. The subset of images is grouped with outline data specified by the second user input, the corresponding temperature data, and the cooking progress levels specified by the first user input at the server of the training data corpus. For example, in some embodiments, the appliance manufacture provides a social networking app for users of the cooking appliance to upload their cooking images and also label the different progress levels of the food items in the cooking images as part of their interactions with others on the social network platform. The labeling of food item identity and doneness levels are interesting to the individual home cooks, but they may not be interested in providing and/or seeing the outline annotations in the online postings. In such cases, the images annotated with different doneness levels are presented to trained personnel (e.g., with or without preliminary outlines generated by automated outline detection algorithms), to generate the outline data corresponding to the subset of images at the server of the training data corpus.

In some embodiments, the second user input is received before the subset of images are transmitted to the server of training data corpus (e.g., training set server 120 and/or training model server 122) for training smart cooking appliances. The subset of images is grouped with outline data specified by the second user input, the corresponding temperature data, and the cooking progress levels specified by the first user input before the subset of images are transmitted to the server of the training data corpus. For example, in some embodiments, the appliance manufacture provides a social networking app for users of the cooking appliance to upload their cooking images and also label the different progress levels of the food items in the cooking images as part of their interactions with others on the social network platform. The manufacture optionally allows users to provide a rough outline for the food items as well, and the food outlines can be refined and adjusted later (e.g., by paid personnel using the same annotation interface). In some embodiments, the second annotation user interface is used as a review interface and after the review is done, the subset of images is included into the training corpus with the corresponding temperature, outline, and cooking progress level data. In some embodiments, the training corpus includes images for each type of food item that is characterized by cooking method (e.g., roasted, baked, steamed, boiled, broiled, fried, stir-fried, microwaved, reheated, melted, softened, defrosted, stewed, etc.), ingredient identity (e.g., cookie, cake, potato, pizza, steak, fish, chick leg, broccoli, carrot, etc.), and optionally ingredient shape (e.g., round, chips, shredded, cubed, minced, chopped, flattened, diced, etc.). Each subset of images is indexed as a group based on these characteristics. In some embodiments, ingredient recognition, cooking method recognition, and/or shape recognition are performed by various deep learning methods automatically, and used for indexing purposes for the training corpus.

In some embodiments, the one or more second sensors include one or more thermal sensors (e.g., the thermal sensors include a two-dimensional array of thermal imaging sensors, or a single or a row of thermal sensors that can be scanned across the cooking platform to generated a two-dimensional heat map of the food support surface) for capturing thermal images corresponding to the food support platform during the operation of the cooking appliance. The capturing of the first cooking data during the first cooking process in the cooking appliance includes capturing a sequence of temperature maps corresponding to the sequence of images (e.g., when each RGB image is taken by a camera, a corresponding image map is also captured by the thermal sensors).

In some embodiments, the subset of images is grouped with the corresponding temperature data and the cooking progress levels specified by the first user input before the subset of images are transmitted to the server of the training data corpus.

In some embodiments, a doneness determination model is trained using the sequence of heat maps, the sequence of images annotated with the outline data, and the doneness level data. For example, the temperature readings of each portion of the food support platform is mapped to the outlines and doneness levels of food items distributed at different locations of the food support platform. In some embodiments, each food item outline can correspond to one doneness level and multiple temperature readings (e.g., different parts of the food item can have slightly different temperature readings). In some embodiments, the spatial relationship between the RGB image and its corresponding heat map can be calibrated prior to shipment of the cooking appliance and the calibration is stored at the server and used to produce a pixel-level mapping between each RGB image in the subset of images and its corresponding heat map. The portions of temperature data that correlate with an area of a given food item and a corresponding doneness level in the RGB image are used with the outline data and doneness data to train the model. In some embodiments, the doneness determination model (e.g., cooking progress level determination model 126) is a neural network that is trained on a difference between the image (e.g., annotated with the outline and the temperature map data) and a food baseline image (e.g., annotated with the outline and the temperature map data) taken at the start of the first cooking process. Using the difference data as the input for the neural network that is specifically trained on doneness levels, the accuracy of the doneness evaluation is improved over another model where multiple outputs must be generated and fitted.

In some embodiments, the cooking appliance includes multiple heating units that are independently adjustable to heat different portions of the food support platform.

In some embodiments, the computer system is further configured to receive third user input specifying a first food item identity for a first portion of a respective image of the subset of images and a second food item identity for a second portion of the respective image of the subset of images. The computer system is also configured to divide each image of the subset of images into respective image portions corresponding to the first and second portions of the respective image. The grouping of the subset of images with corresponding temperature data and cooking progress levels specified by the first user input includes separately grouping the respective image portions of the subset of images that correspond to the first food item identity and the respective image portions of the subset of images that correspond to the second food item identity, each with their corresponding temperature and cooking progress levels specified for food items in the respective image portions. For example, if the images in the subset of images included roasted potatoes and a piece of steak in two different portions of each image (e.g., potatoes on the left half of the image, and the steak on the right half of the image), each image in the subset is divided in the middle, and the half image containing the potatoes is grouped with other half images including only the potatoes and the half image containing the steak is grouped with other half images including only the steak. In each of the groups, the half images are included with the corresponding temperature data, and outline data for the items in those half images. In the training corpus, the two groups are treated as separate groups of training data and indexed under different food items.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

Figure 8:
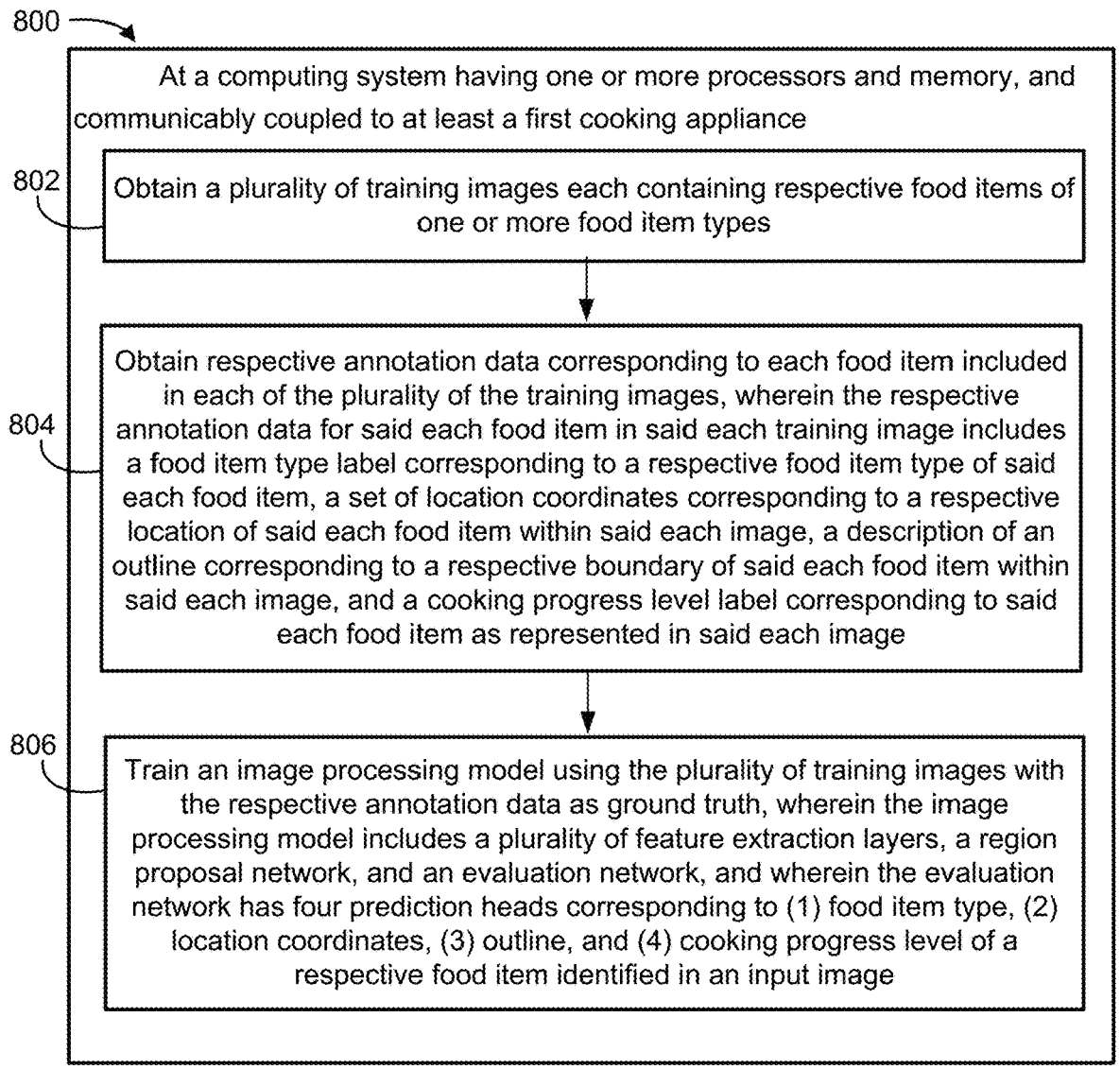
FIG. 8 is a flowchart of a method of determining food item locations and outlines in a food preparation system in accordance with some embodiments.

FIG. 8 is a flowchart of a method 800 of determining food item locations and outlines in a food preparation system in accordance with some embodiments.

In some embodiments, the method 800 is performed at a computing system (e.g., computing system 130, 160, or 130') having one or more processors and memory. The computing system is communicably coupled to at least a first cooking appliance. In some embodiments, the computing system is a server (e.g., computing system 160, training model server 122, training set server 120) that is connected to one or more smart cooking appliances (e.g., appliances 110, 114, 116, 140) (e.g., smart ovens, smart microwave ovens, smart barbecues, smart stove tops, smart toaster ovens, smart rotisserie ovens, smart steamers, smart grill pans, smart fryers, etc.) over a network (e.g., network 190) (e.g., a local area network of a home or a wide area network). In some embodiments, the computing system is a control unit (e.g., computing system 130') that is integrated with a cooking appliance in a smart cooking appliance (e.g., appliance 140') and controls the cooking functions of the cooking appliance and the functions of the cameras. In some embodiments, some of the functions that are performed by the server can be implemented on the control unit of the smart cooking appliance. For example, after the food identity, location, and/or outline determination model is sufficiently trained on images containing various types of food items at the server, the model can be downloaded to individual smart cooking appliances, and the evaluation of cooking progress level for food items cooked in the individual smart cooking appliances can be performed locally at the individual smart cooking appliances during the cooking process without a connection to the server. For example, the cooking progress evaluation is performed based on images taken by a smart cooking appliance during the cooking process, and using the trained food identity, location, and/or outline determination model already stored at the smart cooking appliance.

In the method 800, the computing system obtains (802) a plurality of training images each containing respective food items of one or more food item types.

The computing system obtains (804) respective annotation data corresponding to each food item included in each of the plurality of the training images, wherein the respective annotation data for said each food item in said each training image includes a food item type label corresponding to a respective food item type of said each food item, a set of location coordinates corresponding to a respective location of said each food item within said each image, a description of an outline corresponding to a respective boundary of said each food item within said each image, and a cooking progress level label corresponding to said each food item as represented in said each image. For example, in some embodiments, each image is annotated in accordance with the methods set forth in other parts of this specification (e.g., with respect to FIGS. 3 and 7).

The computing system trains (806) an image processing model (e.g., food item location and outline determination model 124) using the plurality of training images with the respective annotation data as ground truth, wherein the image processing model includes a plurality of feature extraction layers (e.g., CNN 503), a region proposal network (e.g., RPN 504), and an evaluation network 506, and wherein the evaluation network has four prediction heads (e.g., 506-1, 506-2, 506-3, and 506-4) corresponding to (1) food item type, (2) location coordinates, (3) outline, and (4) cooking progress level of a respective food item identified in an input image. In some embodiments, the image processing model is a deep learning model that includes the plurality of feature extraction layers takes each of the plurality of training images as input and outputs respective feature maps of the plurality of training images; the region proposal network takes the respective feature maps as input and outputs proposed regions of interests in the respective feature maps; and the evaluation network takes respective feature maps from the plurality of feature extraction layers and the respective proposed regions of interest from the region proposal network as inputs and outputs four types of evaluation results for the training images.

In some embodiments, the region proposal network and the evaluation network are trained in parallel with different loss functions. The purpose of the region proposal network and the evaluation network are different, and the training are different as well based on the different loss functions. In some embodiments, the image processing model is a Faster R-CNN (Regional Convolution Neural Network) with additional output layers in the evaluation network, including an output layer corresponding to cooking progress level.

In some embodiments, the evaluation network includes four activation layers each corresponding to a respective one of the four prediction heads corresponding to (1) food item type, (2) location coordinates, (3) outline, and (4) cooking progress level, and wherein the four activation layers are arranged in accordance with an order of (1) food item type, followed by (2) location coordinates, followed by (3) outline, and followed by (4) cooking progress level in the evaluation network. In some embodiments, the order of the different prediction heads can be implemented. The main purpose of the evaluation network is to obtain the location coordinates and outline of the food items in the image. The food item type is a first constraint that is considered and the cooking progress level is the last constraint that is considered in the evaluation process through the different layers, but the results of these layers do not have high accuracy and they are primarily used to constrain the training process such that the training for location and outline determination can converge more quickly. With the additional ground truth information for the food item type and the cooking progress level, the food item location and outline results are made more accurate as well. In some embodiments, the food item type and/or cooking progress level can be determined using other techniques, or other models that are trained specifically to determine the food item type and/or cooking progress level of food items.

In some embodiments, the computing system trains a second image processing model (e.g., food item identity determination model 123) that is dedicated to determining food item types, using the plurality of training images with respective portions of the annotation data corresponding to the food item type labels. In some embodiments, the second image processing model is a deep learning neural network that includes multiple subnetworks, including a plurality of coarse category network corresponding to coarse food item categories, and each of the plurality of coarse category network includes a plurality of detailed category networks corresponding individual food item types. In some embodiments, when evaluating a test image received from a cooking appliance, the food item type determination is performed using the second image processing model, and the location and outline determination is performed using the first image processing model. Even though the first image processing model also outputs a food item type result, and a cooking progress level result, together with the food item location and outline results, the food item type and cooking progress level results are not used to influence operation of the cooking appliance (e.g., are not used to change the heating units and mechanical units of the cooking appliance, and are not output to the user on a user device or a display panel on the cooking appliance).

In some embodiments, the computing system trains a third image processing model (e.g., cooking progress level determination model 126) that is dedicated to determining cooking progress level of a respective food item, using the plurality of training images with respective portions of the annotation data corresponding to the cooking progress level labels of food items in the training images. In some embodiments, the third image processing model is a neural network that is trained on difference feature tensors corresponding to different cooking progress levels, e.g., as described in more detail in other parts of this application. In some embodiments, when evaluating a test image received from a cooking appliance, the cooking progress level determination is performed using the third image processing model, and the location and outline determination is performed using the first image processing model. The food item type is optionally known to the user of the cooking appliance already and input by the user. Even though the first image processing model also outputs a food item type result, and a cooking progress level result, together with the food item location and outline results, the food item type and cooking progress level results from the first image processing model are not used to influence operation of the cooking appliance (e.g., are not used to change the heating units and mechanical units of the cooking appliance, and are not output to the user on a user device or a display panel on the cooking appliance). Instead, the cooking progress level determined using the third image processing model is used to influence operation of the cooking appliance (e.g., changing the heating units and mechanical units of the cooking appliance, and output to the user on a user device or a display panel on the cooking appliance).

In some embodiments, the computing system builds an image processing pipeline (e.g., image processing pipeline 500 shown in FIG. 5C), including the first image processing model (e.g., food item location and outline determination model 124), followed by the third image processing model (e.g., the cooking progress level determination model 126).

In some embodiments, the computing system obtains a first raw test image (e.g., an image taken by the sensors inside of the first cooking appliance that cover the entire cooking surface of the first cooking appliance) corresponding to a start of a first cooking process inside the first cooking appliance. The computing system obtains a second raw test image (e.g., an image taken by the sensors inside of the first cooking appliance that cover the entire cooking surface of the first cooking appliance) corresponding to a first time point (e.g., the time corresponding to the current cooking progress level of the first food item) in the first cooking process inside the first cooking appliance. The computing system performs image analysis on the first raw test image (e.g., the baseline raw image) and the second raw test image (e.g., the most recently captured raw image) to determine locations and outlines of a plurality of food items in the first and second raw test images (e.g., using the image analysis model set forth in later part of the specification or other image analysis models) using the first image processing model (e.g., the location and outline determining model). The computing system performs image analysis on respective portions of the first and second raw test images corresponding to each particular food item in the first and second raw test images, using the third image processing model (e.g., the cooking progress level determination model). For example, location coordinates of the food items recognized from each of the raw test images are correlated, assuming that the food items tend to stay at the same locations during the cooking process, even if their shapes and sizes may vary slightly over time. The first baseline image is a copy of the respective portion of the first raw image corresponding to the first food item and the first test image is a copy of the respective portion of the second raw image corresponding to the first food item. In a more specific example, if there are a number of peanut butter cookies and two chicken drumsticks cooking in the first cooking appliance at the same time, image analysis is performed on the image captured of at different time points during the cooking process to determine to locations and outlines of the cookies and the chicken drumsticks using the first image processing model (e.g., the model based on Faster R-CNN with ROI align and four prediction heads). The images are segmented and respective portions of images corresponding to each cookie and each drumstick are analyzed independently to determine the doneness levels of each cookie and each drumstick separately using the third image processing model (e.g., the model based on deep learning of difference feature tensors corresponding to different cooking progress levels).

In some embodiments, the third image processing model (e.g., cooking progress level determination model 126) is further trained with thermal maps corresponding to the training images with the respective portions of the annotation data corresponding to the cooking progress level labels of food items in the training images.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein.

Figure 9:
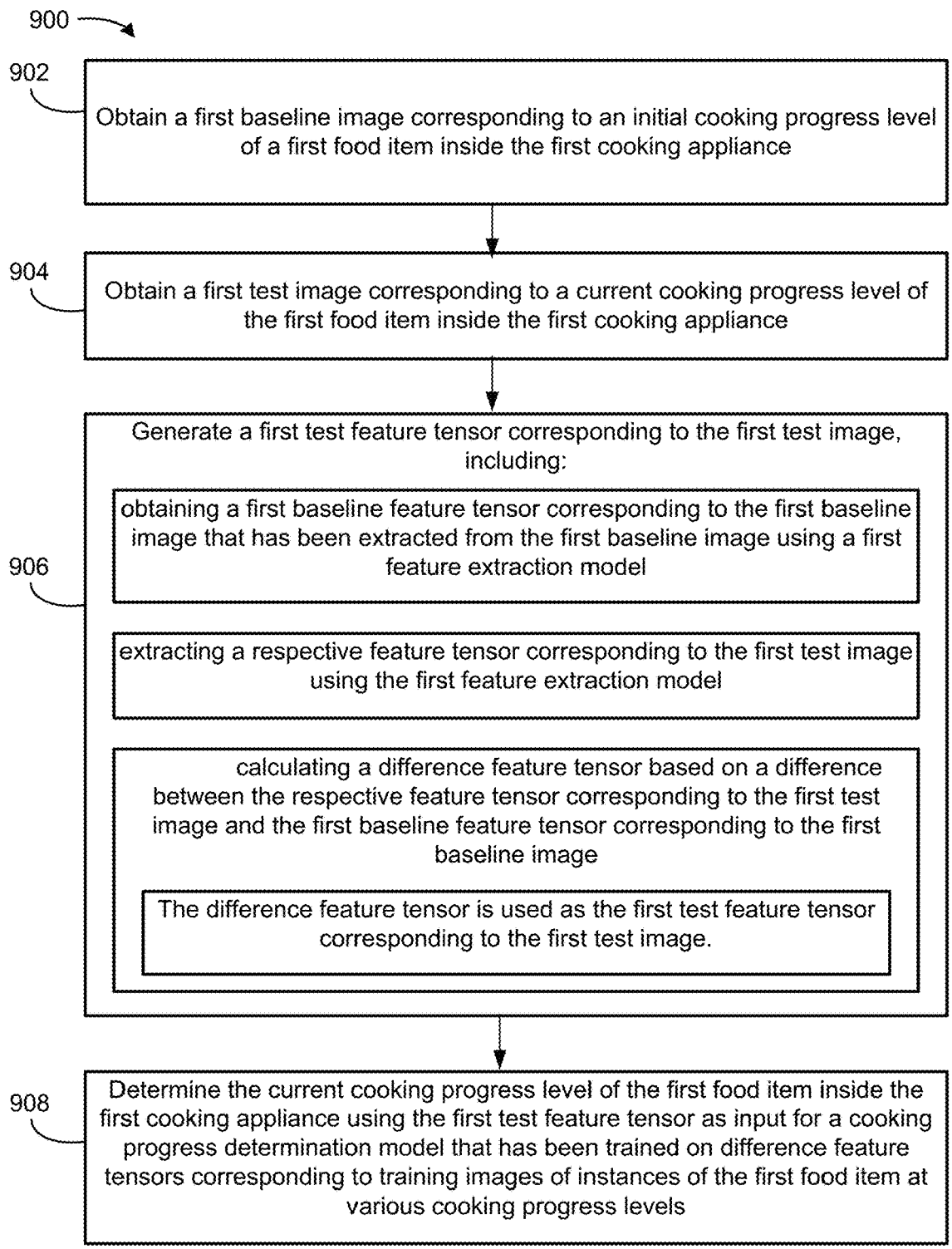
FIG. 9 is a flowchart of a method of determining cooking progress level in a food preparation system in accordance with some embodiments.

FIG. 9 is a flowchart of a method 900 of determining cooking progress level in a food preparation system in accordance with some embodiments.

Method 900 is performed by a computing system (e.g., computing system 130, 160, 130'). The computing system includes one or more processors and memory. The computing system is communicably coupled to at least a first cooking appliance (e.g., appliance 110, 112, 114, 140, or 140'). In some embodiments, the computing system is a server (e.g., computing system 160 or training model server 122) that is connected to one or more smart cooking appliances (e.g., smart ovens, smart microwave ovens, smart barbecues, smart stove tops, smart toaster ovens, smart rotisserie ovens, smart steamers, smart grill pans, smart fryers, etc.) over a network (e.g., a local area network of a home or a wide area network). In some embodiments, the computing system is a control unit (e.g., computing system 130') that is integrated with a cooking appliance in a smart cooking appliance and controls the cooking functions of the cooking appliance and the functions of the cameras. In some embodiments, some of the functions that are performed by the server can be implemented on the control unit of the smart cooking appliance. For example, after the cooking progress level determination model is sufficiently trained on various types of food items at the server, the model can be downloaded to individual smart cooking appliances, and the evaluation of cooking progress level for food items cooked in the individual smart cooking appliances can be performed locally at the individual smart cooking appliances during the cooking process without a connection to the server. For example, the cooking progress evaluation is performed based on images taken by a smart cooking appliance during the cooking process, and using the trained cooking progress level determination model already stored at the smart cooking appliance.

In method 900, the computing system obtains (902) a first baseline image corresponding to an initial cooking progress level of a first food item inside the first cooking appliance (e.g., the baseline image is captured by the first smart cooking appliance in response to detecting the start of the first cooking process (e.g., the user pressing the start button on the oven, or when the user closes the oven door)). The computing system obtains (904) a first test image corresponding to a current cooking progress level of the first food item inside the first cooking appliance. For example, the smart oven is configured to capture an image (e.g., in conjunction with other sensors data, such as temperature, weight map, thermal map, etc.) every 10 seconds after the first cooking process is started, and the first test image is the most recently captured image among a series of images captured periodically by the first cooking appliance. In some embodiments, the determination of the current cooking progress level can also be performed on the fly at the request of the user. For example, the user can process a button on the first home appliance or on a user interface presented on a mobile device (e.g., a phone or tablet device) that is coupled to the first home appliance and request the smart cooking appliance to take an image immediately and have the first cooking appliance or a server coupled to the first cooking appliance perform the cooking progress evaluation on the image. This may be desirable if the user does not want the image to be taken many times during the cooking process (e.g., to save energy and extend lifespan of the cameras), and would rather just check on the state of the cooking progress toward the end of the cooking process a few times to arrive at the desired doneness level. The computing system generates (906) a first test feature tensor corresponding to the first test image. Generating the first test feature tensor includes obtaining a first baseline feature tensor corresponding to the first baseline image that has been extracted from the first baseline image using a first feature extraction model (e.g., the first baseline feature tensor only needs to be extracted once from the first baseline image, and used as a baseline feature tensor for all subsequent test image feature tensors), extracting a respective feature tensor corresponding to the first test image using the first feature extraction model, and calculating a difference feature tensor based on a difference between the respective feature tensor corresponding to the first test image and the first baseline feature tensor corresponding to the first baseline image. The difference feature tensor is used as the first test feature tensor corresponding to the first test image. The computing system determines (908) the current cooking progress level of the first food item inside the first cooking appliance using the first test feature tensor as input for a cooking progress determination model (e.g., cooking progress level determination model 126) that has been trained on difference feature tensors corresponding to training images of instances of the first food item at various cooking progress levels.

In some embodiments, the computing system trains the cooking progress determination model using training images corresponding to a plurality of food item groups (e.g., training images for baked potatoes, training images for peanut butter cookies, training images for steaks, training images for chocolate chip cookies, etc.). The training images include at least a first food item group (e.g., peanut butter cookies) and a second food item group (e.g., chicken drumsticks). The first food item (e.g., a piece of peanut butter cookie currently baking in the first cooking appliance) is an instance of the first food item group (e.g., peanut butter cookies) and not an instance of the second food item group (e.g., chicken drumsticks). The images corresponding to each of the plurality of food item groups include a plurality of image sets, each image set including respective images of an instance of the food item group at each of the plurality of cooking progress levels. For example, for the peanut butter cookie group, the training images include 500 sets of images, each set of the 500 sets of images includes images of a particular peanut butter cookie in the process of being cooked from start to finish, and the set of images for the particular peanut button cookie includes a respective image for each level of the plurality of cooking progress levels.

In some embodiments, to train the cooking progress determination model using the training images corresponding to a plurality of food item groups includes: for each image set of the plurality of image sets of a respective food item group of the plurality of food item groups (e.g., for each of the 500 image sets for the peanut butter cookie group), the computing system generates a respective feature tensor (e.g., using a feature extraction process based on a number of preset image filters) corresponding to each image in the image set (e.g., there are 10 images corresponding to 10 preset cooking progress levels for a particular peanut butter cookie captured in a particular image set of the 500 image sets of the peanut butter cookie group), including a respective feature tensor corresponding to an image labeled for the initial cooking progress level (e.g., the first baseline image taken at the time when the cooking process of the particular peanut butter cookie is started) and a respective feature tensor corresponding to an image labeled for each subsequent cooking progress level of the plurality of cooking progress levels (e.g., an image of the particular peanut button cookie taken at 9 different time points during the cooking process that correspond to the 9 different preset cooking progress levels after the initial cooking progress level). Then, for said each image set of the plurality of image sets of a respective food item group of the plurality of food item groups, for each of the plurality of cooking progress levels (e.g., for each of the 10 preset cooking progress levels), the computing system obtains a respective difference feature tensor by comparing (e.g., subtracting) the respective feature tensor of the image labeled for the cooking progress level and the respective feature tensor of the image labeled for the initial cooking progress level. For example, for the initial cooking progress level, the difference is zero; for cooking progress level 1, the difference is between the feature tensor extracted from the image corresponding to cooking progress level x of 10 and the feature tensor extracted from the baseline image in the image set. The computing system uses the respective difference feature tensor for each of the plurality of cooking progress levels as a training input for the respective food item group at said each cooking progress level. For example, the training input includes 10 difference feature tensors for each of the 500 image sets for the peanut butter cookie group, and the training input corresponding to each of the other food item groups are obtained in similar manners based on images of instances of food items for those other food item groups.

In some embodiments, to generate a respective feature tensor corresponding to each image in the image set, the computing system obtains a corresponding thermal imaging map for said image in the image set and generates the respective feature tensor corresponding to the image based on both the image and the corresponding thermal imaging map for said image. For example, when a raw image of the cooking surface is taken, the first appliance optionally takes a thermal image of the cooking surface as well. The portion of the raw image that corresponds to a particular food item at a particular cooking progress level is used as the image, and the portion of the thermal image that corresponds to the particular food item taken at the same time, are both used to generate the respective feature tensor for the image. For example, the thermal image of a particular peanut butter cookie can be treated in the same manner as an RGB image of the same peanut butter cookie in order to generate a difference feature tensor relative to a baseline thermal image of the peanut butter cookie taken at the start of the cooking process. The difference feature tensor of the thermal image of the cookie and the difference feature tensor of the RGB image of the cookie at the current cooking progress level are merged to form the test feature tensor for that cookie. Correspondingly, the cooking progress determination model (e.g., doneness module 600, doneness determination module 611, doneness models 126, and cooking progress monitoring module 149) needs to be trained with difference feature tensors that were generated using both RGB images and corresponding thermal images.

In some embodiments, the computing system obtains a first raw image (e.g., an image taken by the sensors inside of the first cooking appliance that cover the entire cooking surface of the first cooking appliance) corresponding to a start of a first cooking process inside the first cooking appliance. The computing system also obtains a second raw image (e.g., an image taken by the sensors inside of the first cooking appliance that cover the entire cooking surface of the first cooking appliance) corresponding to a first time point (e.g., the time corresponding to the current cooking progress level of the first food item) in the first cooking process inside the first cooking appliance. The computing system performs image analysis on the first raw image (e.g., the baseline raw image) and the second raw image (e.g., the most recently captured raw image) to determine locations and outlines of a plurality of food items in the first and second raw images (e.g., using the image analysis model set forth in later part of the specification or other image analysis models). The computing system identifies respective portions of the first and second raw images corresponding to the first food item based on the image analysis performed on the first and second raw images (e.g., location coordinates of the food items recognized from each of the raw images are correlated, assuming that the food items tend to stay at the same locations during the cooking process, even if their shapes and sizes may vary slightly over time), wherein the first baseline image is a copy of the respective portion of the first raw image corresponding to the first food item and the first test image is a copy of the respective portion of the second raw image corresponding to the first food item. For example, if there are a number of peanut butter cookies and two chicken drumsticks cooking in the first cooking appliance at the same time, image analysis is performed on the image captured of at different time points during the cooking process to determine to locations and outlines of the cookies and the chicken drumsticks. The images are segmented and respective portions of images corresponding to each cookie and each drumstick are analyzed independently to determine the doneness levels of each cookie and each drumstick separately.

In some embodiments, to perform the image analysis on the first and second raw images, the computing system performs image analysis on the first and second raw images using a convolution neural network that is trained with four constraints. The four constraints include one or more of food location, food item type, food outline, and food cooking progress level.

In some embodiments, the computing system determines a respective current cooking progress level of each of a plurality of food item of a same type inside the first cooking appliance using the cooking progress level determination model (e.g., determining the doneness level for each peanut butter cookie in the first cooking appliance) and outputs an overall cooking progress level for the plurality of food items of the same type inside of the first cooking appliance based on the respective current cooking progress levels of the plurality of food items of the same type inside the first cooking appliance. For example, if 8 of the 10 peanut butter cookies in the oven are 80% done, and 2 of the 10 peanut butter cookies in the oven are 90% done, the computing system causes the first cooking appliance to display "peanut butter cookies: overall (8.5/10) doneness level." In some embodiments, the overall cooking progress level is an average of the cooking progress level of all the food items of the same type. In some embodiments, the overall cooking progress level is the cooking progress level of a majority of food items of the same type. In another example, individual doneness levels are shown next to each cookie in the image of all the cookies.

In some embodiments, the computing system determines a respective current cooking progress level of each of respective food items of two or more distinct food item types inside the first cooking appliance using the cooking progress determination model (e.g., determining the doneness level for each peanut butter cookie and each chick drumstick in the first cooking appliance). The computing system outputs individual cooking progress levels for each of the two or more distinct food item types inside of the first cooking appliance based on the respective current cooking progress levels of the respective food items of the two or more distinct types inside the first cooking appliance. For example, if the overall doneness level of the 10 peanut butter cookies in the oven are 80%, and the overall doneness level of the two chicken drumsticks in the oven is 30%, the computing system causes the first cooking appliance to display "peanut butter cookies: overall (8/10) doneness level; chicken drumsticks: overall (3/10) doneness level." In another example, individual doneness levels are shown next to each cookie and each chicken drumstick in the image of all the cookies and drumsticks.

In some embodiments, the computing system determines a respective current cooking progress level of each food item inside the first cooking appliance using the cooking progress determination model. The computing system identifies a respective heating zone inside of the first cooking appliance that corresponds to a different cooking progress level than one or more other heating zones inside of the first cooking appliance (e.g., the two cookies in the inner middle portion of the oven rack are less cooked as compared to the eight cookies in other parts of the oven rack). The computing adjusts heating power directed to the respective heating zone relative to heating power directed to the one or more other heating zones inside of the first cooking appliance (e.g., increasing the power of the heating unit above the inner middle portion of the oven rack). In some embodiments, the heating zones are predefined by the positions of the heating units inside the cooking appliance, and the overall cooking progress level of each zone is determined based on the cooking progress levels of individual food items within the zone (e.g., this is useful when the heating zones are larger than the size of the food items, and each heating zone includes multiple food items). In some embodiments, the heating zones are defined based on cooking progress levels of the food items, adjacent food items of the same food item type with the same cooking progress levels are grouped into the same zone (e.g., this is useful when the heating elements are small and each food item corresponds to multiple heating elements).

In some embodiments, in accordance with a determination that the current cooking progress level of the first food item inside the first cooking appliance corresponds to a more advance cooking progress level than that of other food items of the same type, the computing system executes a command to cause the first food item to be transported to a cool zone inside of the first cooking appliance. For example, when a food item is determined to reach a desired doneness level before other food items inside cooking appliance, the first cooking appliance includes mechanical mechanisms to transport the food item to a cool "park" zone so that the cooking of the food item is stopped or slowed.

In some embodiments, in accordance with a determination that the current cooking progress level of the first food item inside the first cooking appliance corresponds to a preset cooking progress level, the computing system generates a user alert. For example, the alert includes an image of the current state of the first food item on the first home appliance or on a mobile device of the user. The alert includes images of two subsequent cooking progress levels, for the user to choose a desired cooking progress level as the final desired cooking progress level for the first food item. For example, when the cookie has reached 80% doneness, the user is given opportunity to choose between a soft cookie (95% done) or a hard cookie (100% done) as the final desired state for the cookie. Once the desired state is reached, the cooking appliance automatically stops the cooking process, e.g., by transporting the cookie to a cool part of the oven, or stops the heating power of the oven. In some embodiments, the user alert may be displayed on a display of an appliance of the food preparation system (e.g., display 220 of appliance 200 displays an alert to the user). In some embodiments, the user alert may be displayed by a user device of the food preparation system (e.g., user device B 113 displays an alert to the user indicating that the desired cooking progress has been reached in appliance B 112).

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

Figure 10:
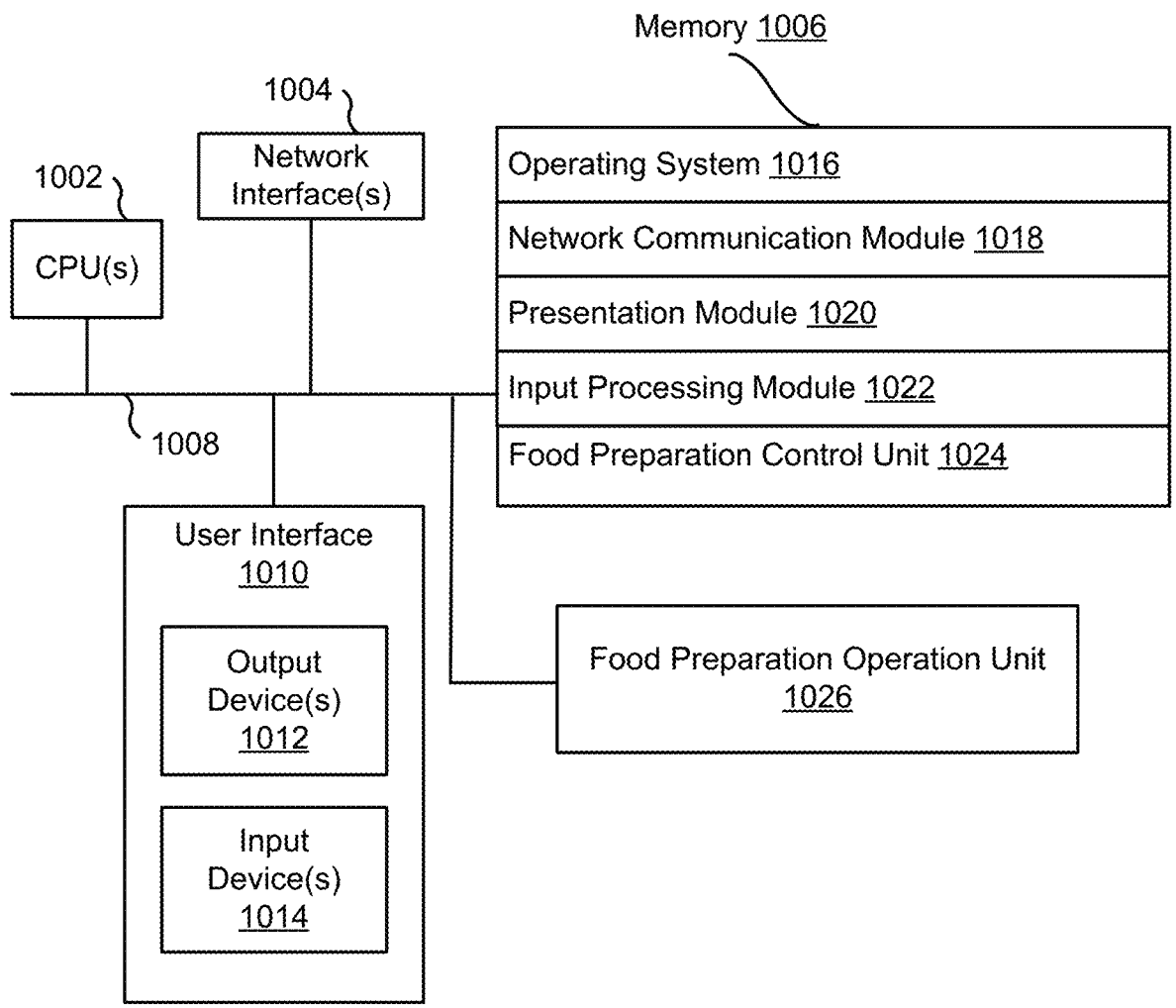
FIG. 10 is a block diagram of an exemplary cooking appliance in accordance with some embodiments.

FIG. 10 is a block diagram of an exemplary cooking appliance 1000 in accordance with some embodiments. The cooking appliance 1000 can serve as appliance 110, 112, 114, 140, 140', 200, 201, 202, 203, 204, for example, in various embodiments. The cooking appliance 1000 includes one or more processing units (CPUs) 1002, one or more network interfaces 1004, memory 1006, and one or more communication buses 1008 for interconnecting these components (sometimes called a chipset). Cooking appliance 1000 also includes a user interface 1010. User interface 1010 includes one or more output devices 1012 that enable presentation of media content, including one or more speakers and/or one or more visual displays. User interface 1010 also includes one or more input devices 1014, including user interface components that facilitate user input such as a keyboard, a mouse, a voice-command input unit or microphone, a touch screen display, a touch-sensitive input pad, a gesture capturing camera, or other input buttons or controls. In some embodiments, cooking appliance 1000 further includes sensors (e.g., sensors 141, 142), which senses operating environment information of the cooking appliance 1000. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the cooking appliance 1000 includes food preparation operation unit 1026 (e.g., heating means that are based on electricity, induction, gas, radiation, etc.). Memory 1006 includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

- operating system 1016 including procedures for handling various basic system services and for performing hardware dependent tasks;
- network communication module 1018 for connecting to external services via one or more network interfaces 1004 (wired or wireless);
- presentation module 1020 for enabling presentation of information;
- input processing module 1022 for detecting one or more user inputs or interactions from one of the one or more input devices 1014 and interpreting the detected input or interaction;
- food preparation control unit 1024, which controls the cooking appliance 1000, including but not limited to modules of appliance 140 or 140' as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Figure 11:
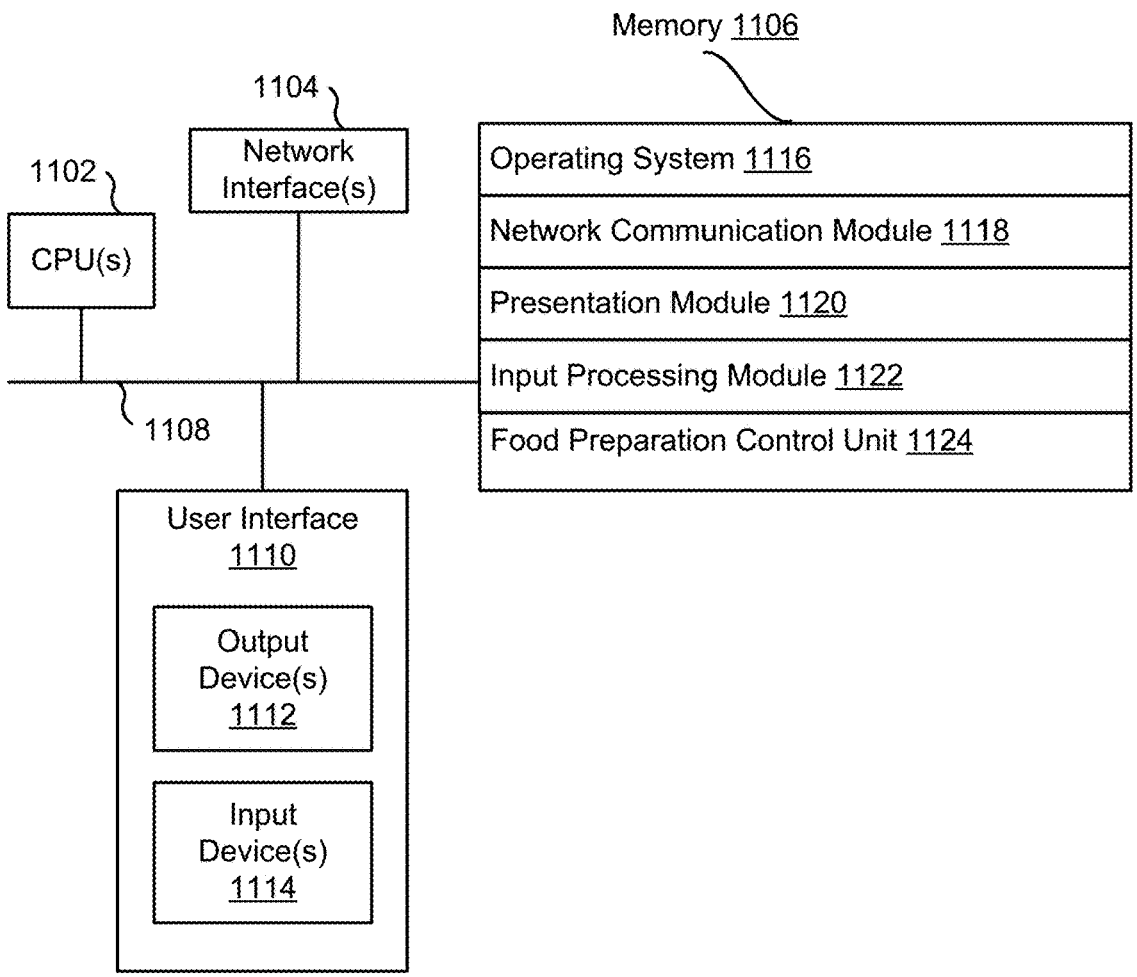
FIG. 11 is a block diagram of an exemplary server in accordance with some embodiments.

FIG. 11 is a block diagram of an exemplary server 1100 in accordance with some embodiments. The server 1100 can serve as server 120, 122, or computing system 160, for example, in various embodiments. The server 1100 includes one or more processing units (CPUs) 1102, one or more network interfaces 1104, memory 1106, and one or more communication buses 1108 for interconnecting these components (sometimes called a chipset). Server 1100 also includes a user interface 1110. User interface 1110 includes one or more output devices 1112 that enable presentation of media content, including one or more speakers and/or one or more visual displays. User interface 1110 also includes one or more input devices 1114, including user interface components that facilitate user input such as a keyboard, a mouse, a voice-command input unit or microphone, a touch screen display, a touch-sensitive input pad, a gesture capturing camera, or other input buttons or controls. Memory 1106 includes non-volatile memory, such as one or more magnetic disk storage devices, one or more optical disk storage devices, one or more flash memory devices, or one or more other non-volatile solid state storage devices. Memory 1106, optionally, includes one or more storage devices remotely located from one or more processing units 1102. Memory 1106, or alternatively the non-volatile memory within memory 1106, includes a non-transitory computer readable storage medium. In some implementations, memory 1106, or the non-transitory computer readable storage medium of memory 1106, stores the following programs, modules, and data structures, or a subset or superset thereof:

- operating system 1116 including procedures for handling various basic system services and for performing hardware dependent tasks;
- network communication module 1118 for connecting to external services via one or more network interfaces 1104 (wired or wireless);
- presentation module 1120 for enabling presentation of information;
- input processing module 1122 for detecting one or more user inputs or interactions from one of the one or more input devices 1114 and interpreting the detected input or interaction; and
- food preparation control unit 1124, which controls the server 1100, including but not limited to modules of computing system 160, server 120, and/or server 122 as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

Figure 12:
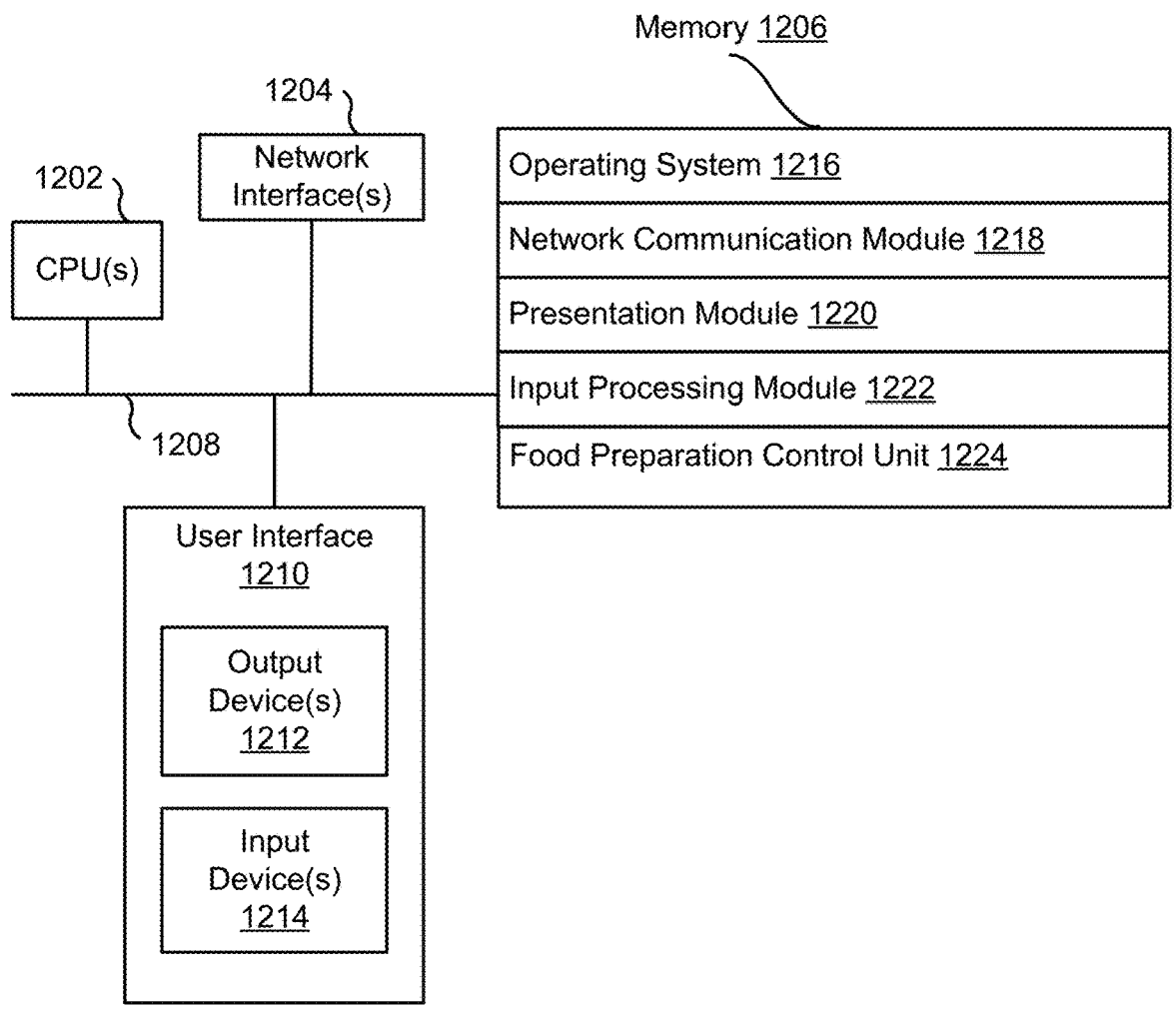
FIG. 12 is a block diagram of an exemplary user device or annotation station in accordance with some embodiments.

FIG. 12 is a block diagram of an exemplary device 1200 in accordance with some embodiments. The device 1200 can serve as user device 111, 113, 115, computing system 130, annotation station 128, for example, in various embodiments. The device 1200 includes one or more processing units (CPUs) 1202, one or more network interfaces 1204, memory 1206, and one or more communication buses 1208 for interconnecting these components (sometimes called a chipset). Device 1200 also includes a user interface 1210. User interface 1210 includes one or more output devices 1212 that enable presentation of media content, including one or more speakers and/or one or more visual displays. User interface 1210 also includes one or more input devices 1214, including user interface components that facilitate user input such as a keyboard, a mouse, a voice-command input unit or microphone, a touch screen display, a touch-sensitive input pad, a gesture capturing camera, or other input buttons or controls. Memory 1206 includes non-volatile memory, such as one or more magnetic disk storage devices, one or more optical disk storage devices, one or more flash memory devices, or one or more other non-volatile solid state storage devices. Memory 1206, optionally, includes one or more storage devices remotely located from one or more processing units 1202. Memory 1206, or alternatively the non-volatile memory within memory 1206, includes a non-transitory computer readable storage medium. In some implementations, memory 1206, or the non-transitory computer readable storage medium of memory 1206, stores the following programs, modules, and data structures, or a subset or superset thereof:

- operating system 1216 including procedures for handling various basic system services and for performing hardware dependent tasks;
- network communication module 1218 for connecting to external services via one or more network interfaces 1204 (wired or wireless);
- presentation module 1220 for enabling presentation of information;

input processing module 1222 for detecting one or more user inputs or interactions from one of the one or more input devices 1214 and interpreting the detected input or interaction; and food preparation control unit 1224, which controls the server 1200, including but not limited to modules of computing system 130 as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1206, optionally, stores a subset of the modules and data structures identified above. Furthermore, memory 1206, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A computing system that is communicably coupled with a cooking appliance and configured to control one or more functions of the cooking appliance, wherein:

the cooking appliance includes a food support platform configured to support food items, one or more first sensors for capturing structured data, including temperature data corresponding to the food items during operation of the cooking appliance, one or more second sensors for capturing unstructured data, including image data corresponding to the food items during the operation of the cooking appliance, and one or more heating units that are configured to the heat food items placed on the food support platform during the operation of the cooking appliance; and the computing system includes one or more processors and memory storing instructions, the instructions, when executed by the one or more processors cause the processors to perform operations comprising:

activating the one or more first sensors and the one or more second sensors to capture first cooking data during a first cooking process in the cooking appliance, including capturing a sequence of temperature values during the first cooking process, and a sequence of images during the first cooking process, wherein each of the sequence of temperature values and each of the sequence of images are recorded with respective timestamps;

displaying, via a display generation component coupled to the computing system, at least a subset of the sequence of images in a first annotation user interface, wherein the first annotation user interface includes:

each of the subset of the sequence of images displayed in accordance with a timeline of the first cooking process; and a plurality of input regions for specifying respective cooking progress levels of food items in the subset of the sequence of images;

receiving first user input specifying the respective cooking progress levels of food items in the subset of the sequence of images;

grouping the subset of images with corresponding temperature data and cooking progress levels specified by the first user input; and transmitting the subset of images with the corresponding temperature data and cooking progress levels to a server of training data corpus for training smart cooking appliances.

2. The computing system of claim 1, wherein the operations include:

displaying, via the display generation component coupled to the computing system, a respective image in the subset of the sequence of images in a second annotation user interface, wherein the second annotation user interface includes a plurality of outline tools corresponding to different food item shapes; and receiving second user input specifying a respective outline for each food item in the respective image displayed of the subset of the sequence of images using the plurality of outline tools.

3. The computing system of claim 2, wherein:

the second user input is received after the subset of images are transmitted to the server of training data corpus for training smart cooking appliances, and the subset of images are grouped with outline data specified by the second user input, the corresponding temperature data, and the cooking progress levels specified by the first user input at the server of the training data corpus.

4. The computing system of claim 2, wherein:

the second user input is received before the subset of images are transmitted to the server of training data corpus for training smart cooking appliances, and the subset of images are grouped with outline data specified by the second user input, the corresponding temperature data, and the cooking progress levels specified by the first user input before the subset of images are transmitted to the server of the training data corpus.

5. The computing system of claim 1, wherein:

the one or more second sensors includes one or more thermal sensors for capturing thermal images corresponding to the food support platform during the operation of the cooking appliance; and the capturing of the first cooking data during the first cooking process in the cooking appliance includes capturing a sequence of temperature maps corresponding to the sequence of images.

6. The computing system of claim 5, wherein the subset of images are grouped with the corresponding temperature data and the cooking progress levels specified by the first user input before the subset of images are transmitted to the server of the training data corpus.

7. The computing system of claim 6, wherein a doneness determination model is trained using the sequence of heat maps and the sequence of images annotated with the outline data and the doneness level data.

8. The computing system of claim 1, wherein the one or more heating units includes multiple heating units that are independently adjustable to heat different portions of the food support platform.

9. The computing system of claim 1, including:
receiving third user input specifying a first food item identity for a first portion of a respective image of the subset of images and a second food item identity for a second portion of the respective image of the subset of images; and
dividing each image of the subset of images into respective image portions corresponding to the first and second portions of the respective image, wherein grouping the subset of images with corresponding temperature data and cooking progress levels specified by the first user input includes:
separately grouping the respective image portions of the subset of images that correspond to the first food item identity and the respective image portions of the subset of images that correspond to the second food item identity, each with their corresponding temperature and cooking progress levels specified for food items in the respective image portions.

10. A method of collecting and annotating training data, comprising:
at a computing system that is communicably coupled with a cooking appliance and configured to control one or more functions of the cooking appliance, wherein the cooking appliance includes a food support platform configured to support food items, one or more first sensors for capturing structured data, including temperature data corresponding to the food items during operation of the cooking appliance, one or more second sensors for capturing unstructured data, including image data corresponding to the food items during the operation of the cooking appliance, and one or more heating units that are configured to the heat food items placed on the food support platform during the operation of the cooking appliance:
activating the one or more first sensors and the one or more second sensors to capture first cooking data during a first cooking process in the cooking appliance, including capturing a sequence of temperature values during the first cooking process, and a sequence of images during the first cooking process, wherein each of the sequence of temperature values and each of the sequence of images are recorded with respective timestamps;
displaying, via a display generation component coupled to the computing system, at least a subset of the sequence of images in a first annotation user interface, wherein the first annotation user interface includes:
each of the subset of the sequence of images displayed in accordance with a timeline of the first cooking process; and
a plurality of input regions for specifying respective cooking progress levels of food items in the subset of the sequence of images;
receiving first user input specifying the respective cooking progress levels of food items in the subset of the sequence of images;
grouping the subset of images with corresponding temperature data and cooking progress levels specified by the first user input; and
transmitting the subset of images with the corresponding temperature data and cooking progress levels to a server of training data corpus for training smart cooking appliances.

11. The method of claim 10, including:
displaying, via the display generation component coupled to the computing system, a respective image in the subset of the sequence of images in a second annotation user interface, wherein the second annotation user interface includes a plurality of outline tools corresponding to different food item shapes; and
receiving second user input specifying a respective outline for each food item in the respective image displayed of the subset of the sequence of images using the plurality of outline tools.

12. The method of claim 11, wherein:
the second user input is received after the subset of images are transmitted to the server of training data corpus for training smart cooking appliances, and
the subset of images are grouped with outline data specified by the second user input, the corresponding temperature data, and the cooking progress levels specified by the first user input at the server of the training data corpus.

13. The method of claim 11, wherein:
the second user input is received before the subset of images are transmitted to the server of training data corpus for training smart cooking appliances, and
the subset of images are grouped with outline data specified by the second user input, the corresponding temperature data, and the cooking progress levels specified by the first user input before the subset of images are transmitted to the server of the training data corpus.

14. The method of claim 10, wherein:
the one or more second sensors includes one or more thermal sensors for capturing thermal images corresponding to the food support platform during the operation of the cooking appliance; and
the capturing of the first cooking data during the first cooking process in the cooking appliance includes capturing a sequence of temperature maps corresponding to the sequence of images.

15. The method of claim 14, wherein the subset of images are grouped with the corresponding temperature data and the cooking progress levels specified by the first user input before the subset of images are transmitted to the server of the training data corpus.

16. The method of claim 15, wherein a doneness determination model is trained using the sequence of heat maps and the sequence of images annotated with the outline data and the doneness level data.

17. The method of claim 10, wherein the one or more heating units includes multiple heating units that are independently adjustable to heat different portions of the food support platform.

18. The method of claim 10, including:
receiving third user input specifying a first food item identity for a first portion of a respective image of the subset of images and a second food item identity for a second portion of the respective image of the subset of images; and
dividing each image of the subset of images into respective image portions corresponding to the first and second portions of the respective image, wherein grouping the subset of images with corresponding temperature data and cooking progress levels specified by the first user input includes:

separately grouping the respective image portions of the subset of images that correspond to the first food item identity and the respective image portions of the subset of images that correspond to the second food item identity, each with their corresponding temperature and cooking progress levels specified for food items in the respective image portions.

19. A non-transitory computer-readable storage medium, including instructions, the instructions, when executed by one or more processors of a computing system that is communicably coupled with a cooking appliance and configured to control one or more functions of the cooking appliance, cause the processors to perform operations, wherein the cooking appliance includes a food support platform configured to support food items, one or more first sensors for capturing structured data, including temperature data corresponding to the food items during operation of the cooking appliance, one or more second sensors for capturing unstructured data, including image data corresponding to the food items during the operation of the cooking appliance, and one or more heating units that are configured to the heat food items placed on the food support platform during the operation of the cooking appliance, and the operations comprises:

activating the one or more first sensors and the one or more second sensors to capture first cooking data during a first cooking process in the cooking appliance, including capturing a sequence of temperature values during the first cooking process, and a sequence of images during the first cooking process, wherein each of the sequence of temperature values and each of the sequence of images are recorded with respective timestamps;

displaying, via a display generation component coupled to the computing system, at least a subset of the sequence of images in a first annotation user interface, wherein the first annotation user interface includes:
  each of the subset of the sequence of images displayed in accordance with a timeline of the first cooking process; and
  a plurality of input regions for specifying respective cooking progress levels of food items in the subset of the sequence of images;

receiving first user input specifying the respective cooking progress levels of food items in the subset of the sequence of images;

grouping the subset of images with corresponding temperature data and cooking progress levels specified by the first user input; and transmitting the subset of images with the corresponding temperature data and cooking progress levels to a server of training data corpus for training smart cooking appliances.

20. The computer-readable storage medium of claim 19, wherein the operations include:

displaying, via the display generation component coupled to the computing system, a respective image in the subset of the sequence of images in a second annotation user interface, wherein the second annotation user interface includes a plurality of outline tools corresponding to different food item shapes; and receiving second user input specifying a respective outline for each food item in the respective image displayed of the subset of the sequence of images using the plurality of outline tools.

* * * * *